US007742675B2

(12) United States Patent
Sayres et al.

(10) Patent No.: US 7,742,675 B2
(45) Date of Patent: Jun. 22, 2010

(54) CABLE TROUGH SYSTEM AND METHOD

(75) Inventors: Derek Sayres, Lonsdale, MN (US); Thomas C. Tinucci, Chaska, MN (US); Thomas L. Barnes, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 25 days.

(21) Appl. No.: 11/698,799

(22) Filed: Jan. 26, 2007

(65) Prior Publication Data

US 2008/0181568 A1    Jul. 31, 2008

(51) Int. Cl.
G02B 6/00 (2006.01)
(52) U.S. Cl. ............................ 385/137; 248/68.1
(58) Field of Classification Search ......... 385/134–136; 248/49, 68.1
See application file for complete search history.

(56) References Cited

U.S. PATENT DOCUMENTS

| 799,320 | A | | 9/1905 | Franks | |
|---|---|---|---|---|---|
| 2,556,659 | A | * | 6/1951 | Patterson | 285/145.3 |
| 2,823,056 | A | * | 2/1958 | Di Meo Unico et al. | 403/376 |
| 2,834,622 | A | * | 5/1958 | Reeves | 403/335 |
| 3,022,972 | A | * | 2/1962 | Bunston | 248/68.1 |
| 3,042,351 | A | * | 7/1962 | Du Bois | 248/49 |
| 3,053,358 | A | * | 9/1962 | Gross | 52/696 |
| 3,351,699 | A | | 11/1967 | Merckle | |
| 3,761,603 | A | | 9/1973 | Hays et al. | |
| 3,927,698 | A | | 12/1975 | Johanssen | |
| 4,077,434 | A | | 3/1978 | Sieckert et al. | |
| 4,105,051 | A | * | 8/1978 | Visentin | 138/162 |
| 4,251,968 | A | * | 2/1981 | Raith et al. | 52/481.2 |
| 4,438,614 | A | * | 3/1984 | Raith et al. | 52/580 |
| 4,874,322 | A | * | 10/1989 | Dola et al. | 439/210 |
| 4,907,767 | A | | 3/1990 | Corsi et al. | |
| 4,951,716 | A | | 8/1990 | Tsunoda et al. | |
| D321,682 | S | | 11/1991 | Henneberger | |
| D321,862 | S | | 11/1991 | Henneberger | |
| 5,067,678 | A | | 11/1991 | Henneberger et al. | |
| 5,160,811 | A | | 11/1992 | Ritzmann | |
| 5,161,580 | A | | 11/1992 | Klug | |
| 5,240,209 | A | | 8/1993 | Kutsch | |

(Continued)

FOREIGN PATENT DOCUMENTS

DE    1 130 492    5/1962

(Continued)

OTHER PUBLICATIONS

ADC Telecommunications brochure entitled "FiberGuide® Fiber Management Systems," 33 pages, dated Oct. 1995.

(Continued)

*Primary Examiner*—Frank G Font
*Assistant Examiner*—Peter Radkowski
(74) *Attorney, Agent, or Firm*—Merchant & Gould P.C.

(57) ABSTRACT

A telecommunications cable management system includes trough elements including a planar top surface and sides for cable routing and management. The trough elements are made from separate parts assembled together with a mating arrangement. The mating arrangement allows assembly of the system on site, such as by snapping the parts together. The trough elements are then assembled together to form the cable management system.

4 Claims, 46 Drawing Sheets

U.S. PATENT DOCUMENTS

| | | | |
|---|---|---|---|
| 5,271,585 A | | 12/1993 | Zetena, Jr. |
| 5,316,243 A | | 5/1994 | Henneberger |
| 5,316,244 A | | 5/1994 | Zetena, Jr. |
| 5,335,349 A | | 8/1994 | Kutsch et al. |
| 5,469,893 A | | 11/1995 | Caveney et al. |
| 5,503,354 A | | 4/1996 | Lohf et al. |
| 5,752,781 A | * | 5/1998 | Haataja et al. ............... 403/387 |
| 5,753,855 A | | 5/1998 | Nicoli et al. |
| 5,792,992 A | * | 8/1998 | Handler ....................... 174/101 |
| 5,899,025 A | | 5/1999 | Casey et al. |
| 5,923,753 A | | 7/1999 | Haataja et al. |
| 5,937,131 A | * | 8/1999 | Haataja et al. ............... 385/136 |
| 5,942,729 A | * | 8/1999 | Carlson et al. ............. 174/68.1 |
| 5,995,699 A | | 11/1999 | Vargas et al. |
| 6,037,538 A | | 3/2000 | Brooks |
| 6,037,543 A | | 3/2000 | Nicoli et al. |
| 6,076,779 A | * | 6/2000 | Johnson ....................... 248/49 |
| 6,107,575 A | | 8/2000 | Miranda |
| 6,118,075 A | * | 9/2000 | Baker et al. ............... 174/72 A |
| 6,198,047 B1 | | 3/2001 | Barr |
| 6,284,975 B1 | * | 9/2001 | McCord et al. ........... 174/71 R |
| 6,424,779 B1 | * | 7/2002 | Ellison et al. ................ 385/134 |
| 6,450,458 B1 | | 9/2002 | Bernard |
| 6,522,823 B1 | | 2/2003 | Wentworth et al. |
| 6,535,683 B1 | | 3/2003 | Johnson et al. |
| 6,559,378 B1 | | 5/2003 | Bernard |
| 6,586,680 B1 | * | 7/2003 | Nelson ......................... 174/60 |
| 6,586,690 B2 | * | 7/2003 | Shimomura et al. .......... 200/6 A |
| 6,603,073 B2 | * | 8/2003 | Ferris ......................... 174/68.3 |
| 6,625,373 B1 | | 9/2003 | Wentworth et al. |
| 6,631,875 B1 | * | 10/2003 | Kampf et al. ............... 248/68.1 |
| 6,634,605 B2 | * | 10/2003 | Bernard et al. ............. 248/68.1 |
| 6,648,715 B2 | * | 11/2003 | Wiens et al. ................ 446/121 |
| 6,708,918 B2 | | 3/2004 | Ferris et al. |
| 6,709,186 B2 | * | 3/2004 | Ferris et al. ................. 403/293 |
| 6,715,719 B2 | | 4/2004 | Nault et al. |
| 6,727,434 B2 | | 4/2004 | Jadaud et al. |
| 6,739,795 B1 | * | 5/2004 | Haataja et al. ............... 403/387 |
| 6,763,169 B2 | * | 7/2004 | Wentworth et al. ......... 385/134 |
| 6,810,191 B2 | * | 10/2004 | Ferris et al. .................. 385/134 |
| 6,835,891 B1 | * | 12/2004 | Herzog et al. .................. 174/66 |
| 6,934,456 B2 | | 8/2005 | Ferris et al. |
| 7,034,227 B2 | | 4/2006 | Fox |
| 7,045,707 B1 | | 5/2006 | Galasso |
| 7,113,685 B2 | | 9/2006 | Ferris et al. |
| 7,224,880 B2 | | 5/2007 | Ferris et al. |
| 7,226,022 B2 | | 6/2007 | Bernard et al. |
| 2002/0096606 A1 | | 7/2002 | Bernard et al. |
| 2002/0194788 A1 | * | 12/2002 | Bennett ....................... 49/467 |
| 2003/0016931 A1 | * | 1/2003 | Ferris et al. .................. 385/134 |
| 2003/0047343 A1 | | 3/2003 | Ferris |
| 2003/0082986 A1 | * | 5/2003 | Wiens et al. ................ 446/120 |
| 2004/0124321 A1 | | 7/2004 | Kampf |
| 2007/0092196 A1 | * | 4/2007 | Bayazit et al. ............... 385/136 |

FOREIGN PATENT DOCUMENTS

| | | |
|---|---|---|
| DE | 37 42 448 A1 | 6/1989 |
| DE | 296 10 947 U1 | 8/1996 |
| EP | 0 863 594 A2 | 9/1998 |
| EP | 0 933 850 A1 | 8/1999 |
| FR | 2 238 828 | 2/1975 |
| FR | 2 735 557 A1 | 12/1996 |
| JP | 05172281 A | 7/1993 |
| SU | 1272387 A1 | 11/1986 |

OTHER PUBLICATIONS

Warren & Brown & Staff brochure pages entitled "lightpaths," Issue 2, 11 pages, dated 1995.

ADC Telecommunications brochure entitled "FiberGuide™ Fiber Management System," 6 pages, dated Jun. 1989.

ADC Telecommunications brochure entitled "ADC FiberGuide® System Express Exit™ 2×2," 2 pages, dated May 1999.

ADC Telecommunications brochure entitled "FiberGuide® Fiber Management Systems," 37 pages, dated Jun. 1998.

ADC Telecommunications brochure entitled "FiberGuide® Fiber Management Systems," 56 pages, dated Sep. 2000.

ADC Telecommunications brochure entitled "FiberGuide® Fiber Management Systems," 90 pages, dated May 2005.

* cited by examiner

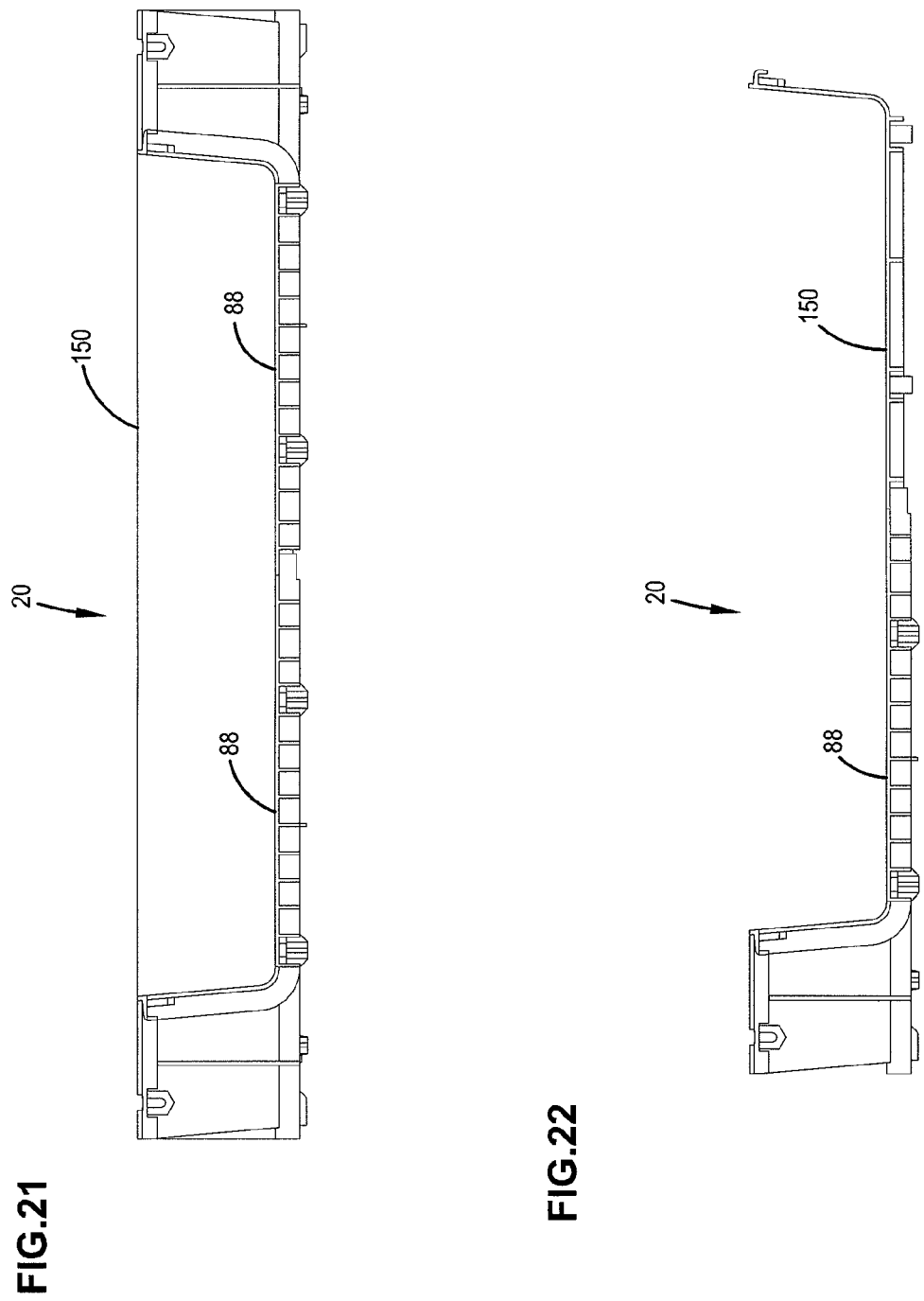

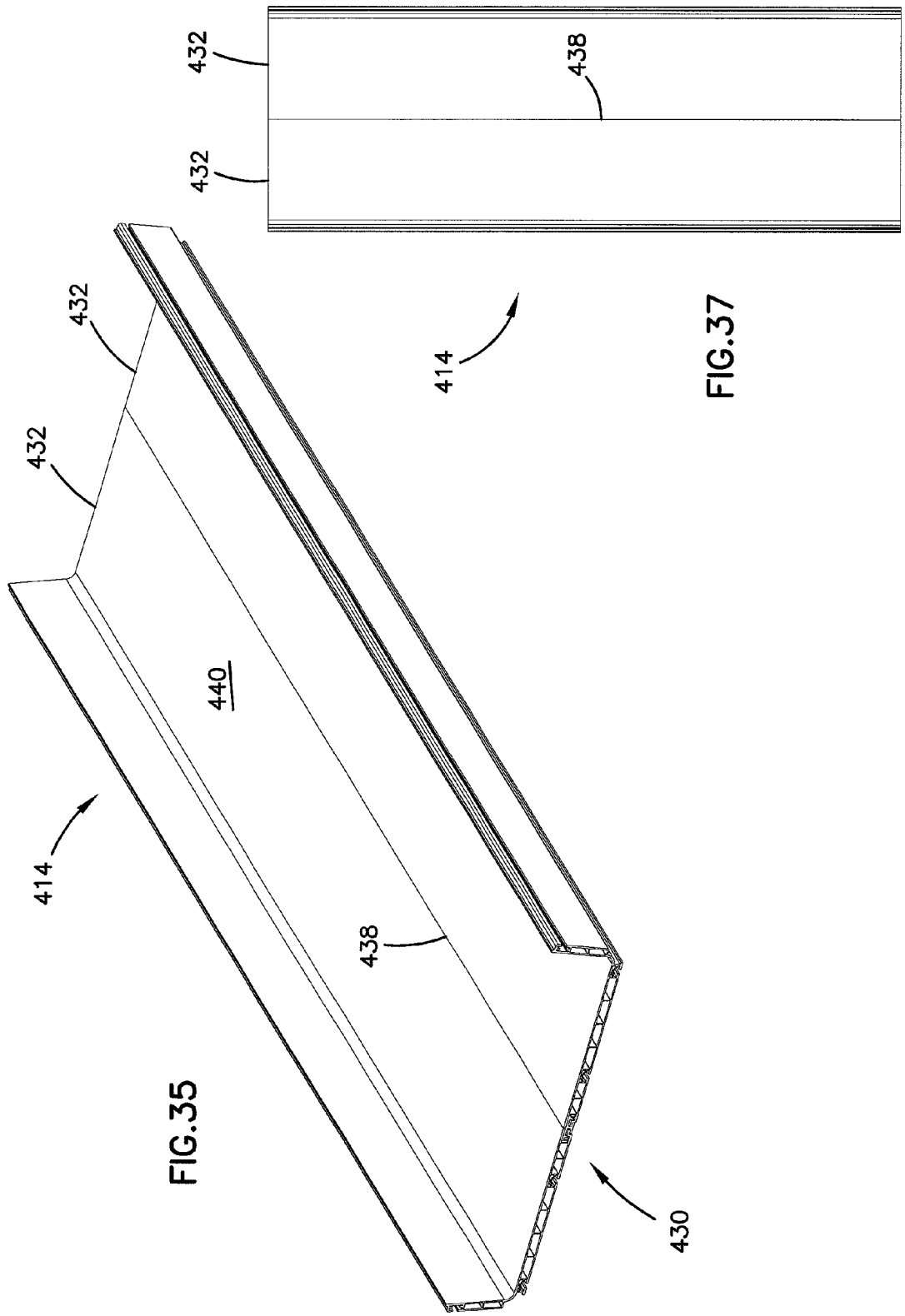

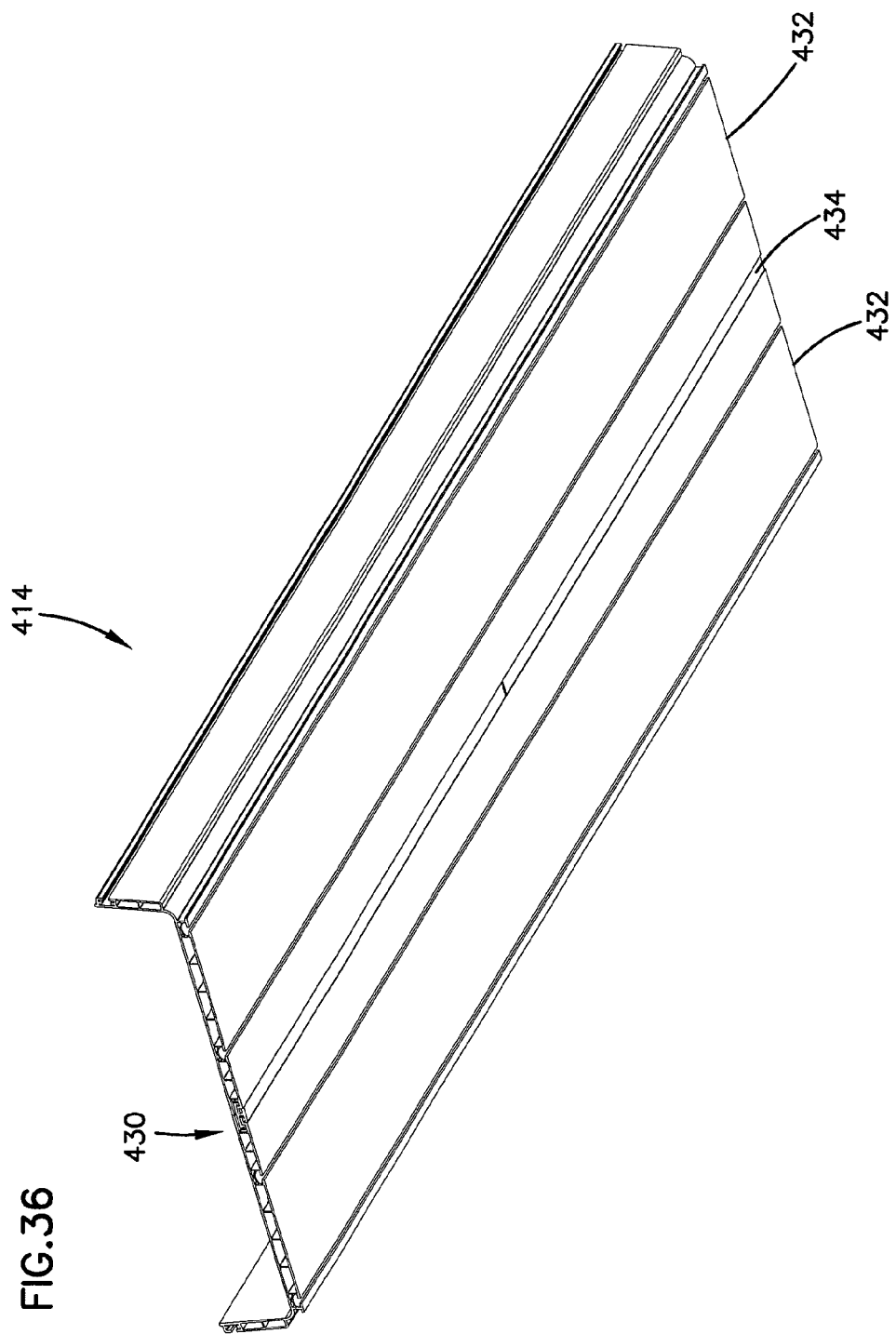

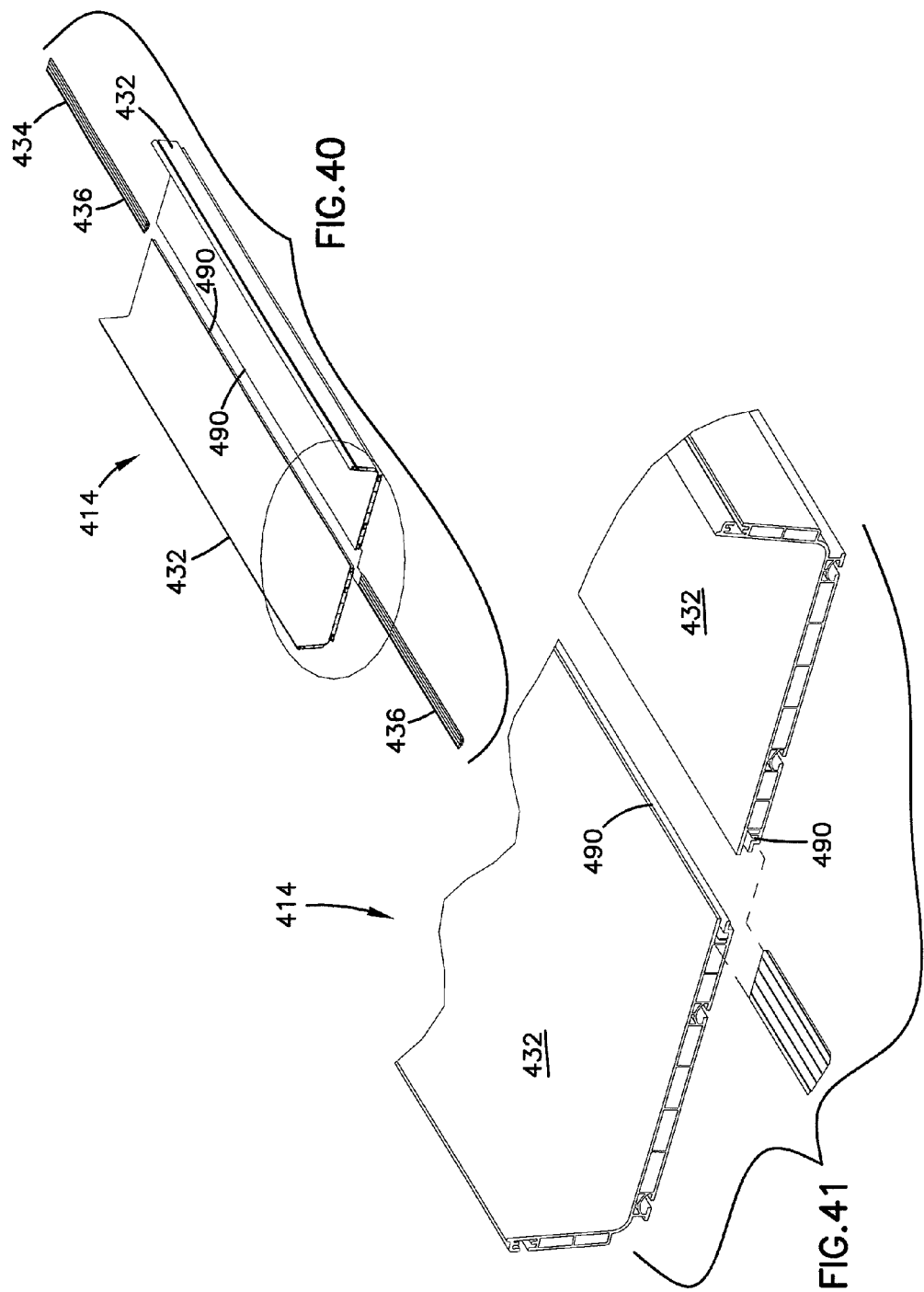

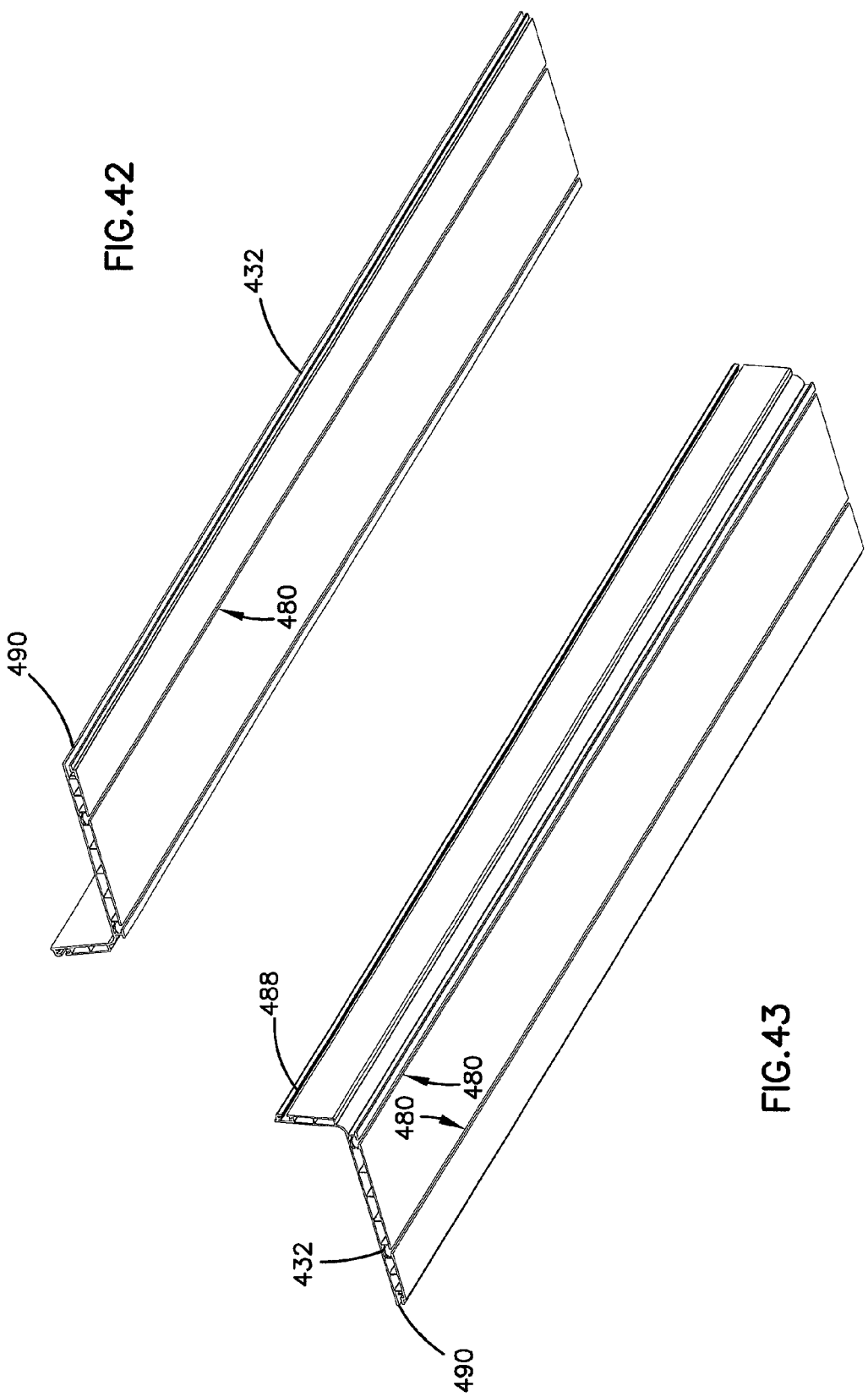

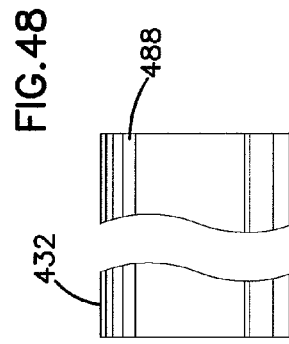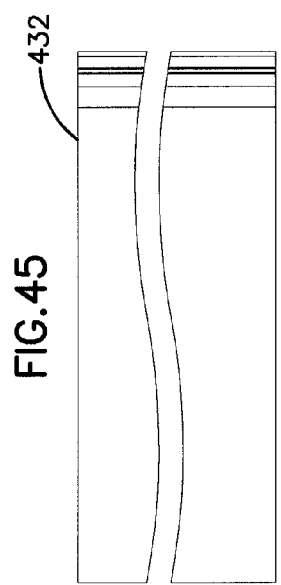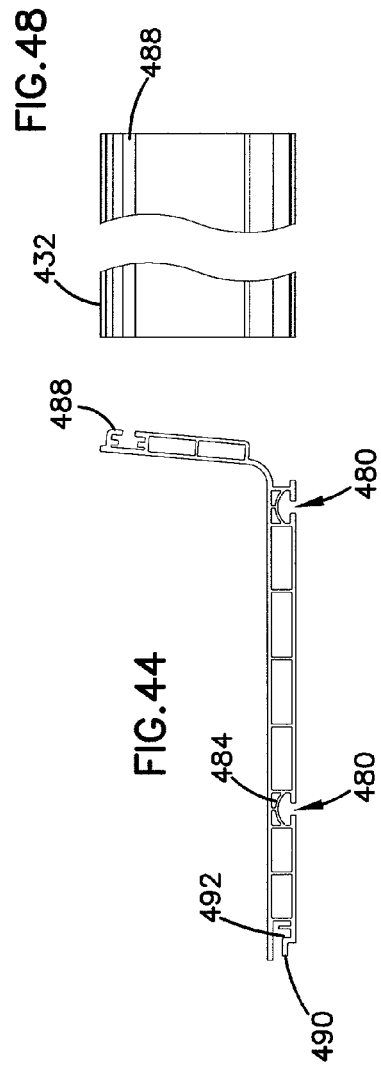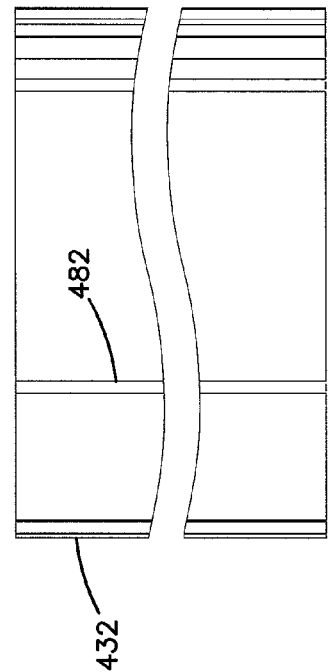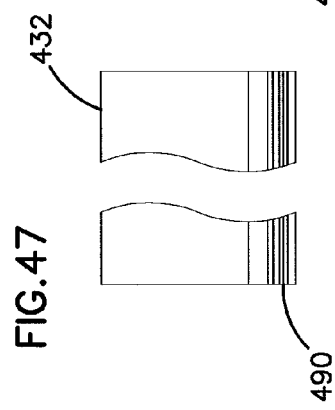

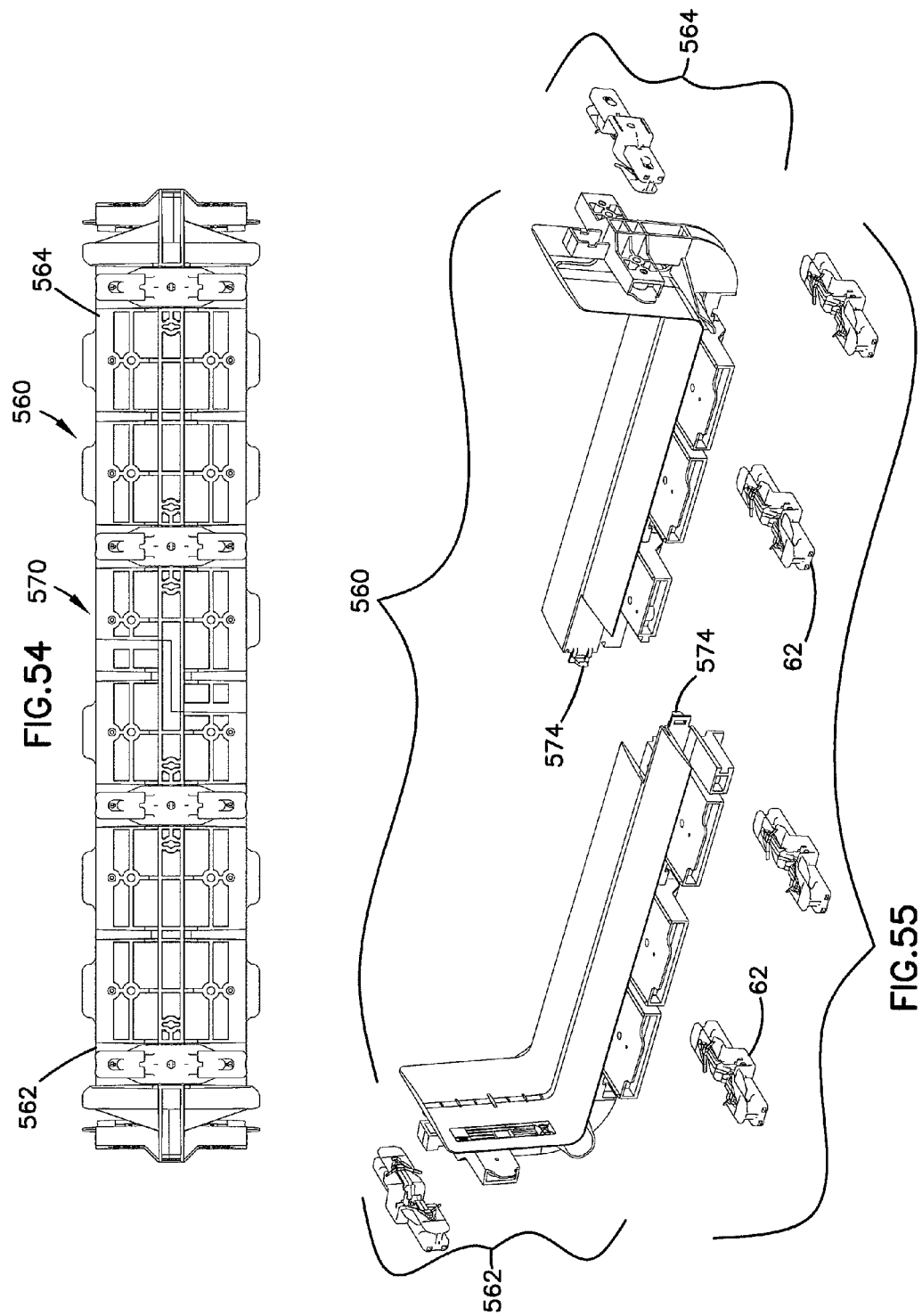

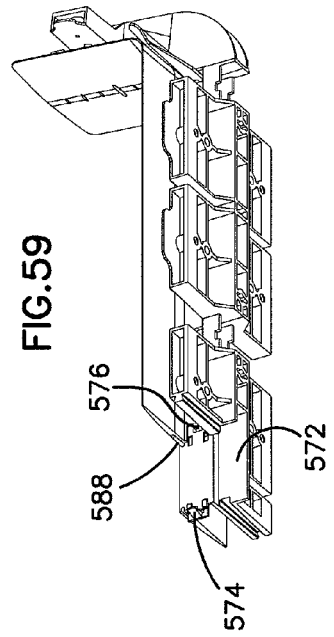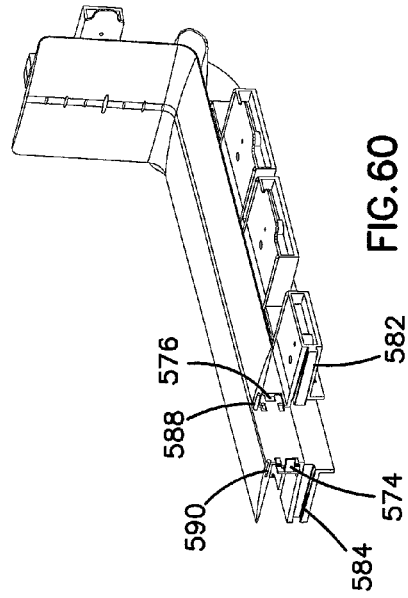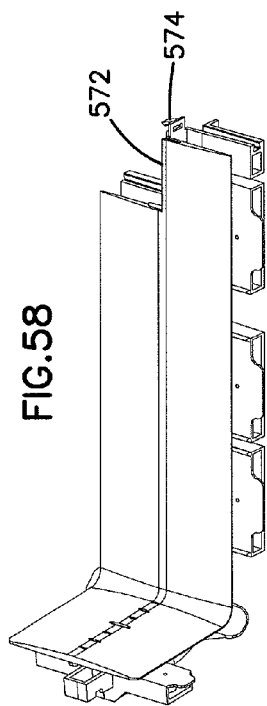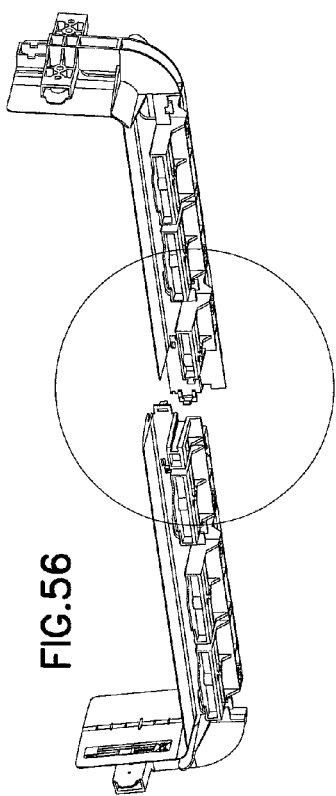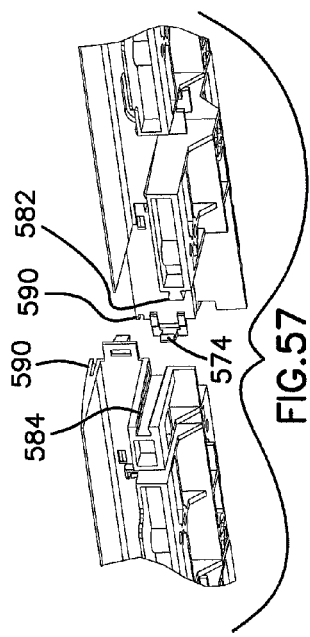

CABLE TROUGH SYSTEM AND METHOD

RELATED APPLICATION

The present application relates to application Ser. No. 11/246,003, filed Oct. 7, 2005, entitled CABLE TROUGH SYSTEM AND METHOD. Application Ser. No. 11/246,003 is hereby incorporated by reference in its entirety.

FIELD OF THE INVENTION

This application relates to a system for the management and routing of cables, such as telecommunications cables. More particularly, this invention pertains to troughs, fittings, and couplings for the system.

BACKGROUND OF THE INVENTION

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Copper cables, hybrid cables or other transmission cables also need proper management and protection.

When routing optical fibers, it is desirable that a routing system will be easy to assemble, readily accessible and adaptable to changes in equipment needs. Accordingly, such routing systems include a plurality of trough members such as troughs and couplings for forming the cable routing paths. The trough system members are joined together by couplings. U.S. Pat. No. 5,067,678 to Henneberger et al dated Nov. 26, 1991 concerns a cable routing system that includes a plurality of troughs and fittings. The '678 patent further discloses a coupling (element 250 in FIG. 1 of the '678 patent) for joining trough members and fittings. With best reference to FIGS. 6-7 of the '678 patent, a plurality of hardware is disclosed for joining the trough members. U.S. Pat. Nos. 5,316,243; 5,752,781 and 6,715,719 show additional examples of couplings.

U.S. Pat. No. 6,631,875 shows a cable trough system with various separate components joined together to assemble the system.

Several concerns arise with cable routing systems, including the ease of manufacture and installation of the troughs, couplings, and fittings, and the adequacy of the size of the system components to handle the number of cables in the system. Having enough space for the cables passing through the system is a particular concern as higher and higher densities are desired. There is a need for continued development of cable management systems.

SUMMARY OF THE INVENTION

A telecommunications cable management system includes trough elements including a planar top surface and sides for cable routing and management. In one preferred embodiment, the trough elements are made from separate parts assembled together. In one preferred embodiment, a mating arrangement is used to assemble the parts together. The mating arrangement allows assembly of the system on site, such as by snapping the parts together. The trough elements are then assembled together to form the cable management system.

BRIEF DESCRIPTION OF THE DRAWINGS

FIG. 21 is a first side view of the Tee component of FIG. 20;

FIG. 22 is a further side view of the Tee component of FIG. 20;

FIG. 35 is a top perspective view of another embodiment of a longitudinal trough member;

FIG. 36 is a bottom perspective view of the longitudinal trough member of FIG. 35;

FIG. 37 is a top view of the longitudinal trough member of FIG. 35;

FIG. 40 is an exploded top perspective view of the longitudinal trough member of FIG. 35;

FIG. 41 is an enlarged top perspective view of the view of FIG. 40;

FIG. 42 is a bottom perspective view of one of the longitudinal sections of the longitudinal trough member of FIG. 35;

FIG. 43 is a further bottom perspective view of the longitudinal section of FIG. 42;

FIG. 44 is an end view of the longitudinal section of FIG. 42;

FIG. 45 is a top view of the longitudinal section of FIG. 42, with portions removed;

FIG. 46 is a bottom view of the longitudinal section of FIG. 42, with portions removed;

FIG. 47 is a first side view of the longitudinal section of FIG. 42, with portions removed;

FIG. 48 is an opposite side view of the longitudinal section of FIG. 42, with portions removed;

FIG. 54 is a bottom view of the coupler of FIG. 52;

FIG. 55 is an exploded perspective view of the coupler of FIG. 52;

FIG. 56 is a further exploded bottom perspective view of portions of the coupler of FIG. 52;

FIG. 57 is an enlarged view of the bottom perspective view of FIG. 56;

FIG. 58 is a top perspective view of one of the components of the coupler of FIG. 52;

FIG. 59 is a bottom perspective view of the component of FIG. 58;

FIG. 60 is a further top perspective view of the component of FIG. 58;

DETAILED DESCRIPTION OF THE PREFERRED EMBODIMENTS

Figure 1:
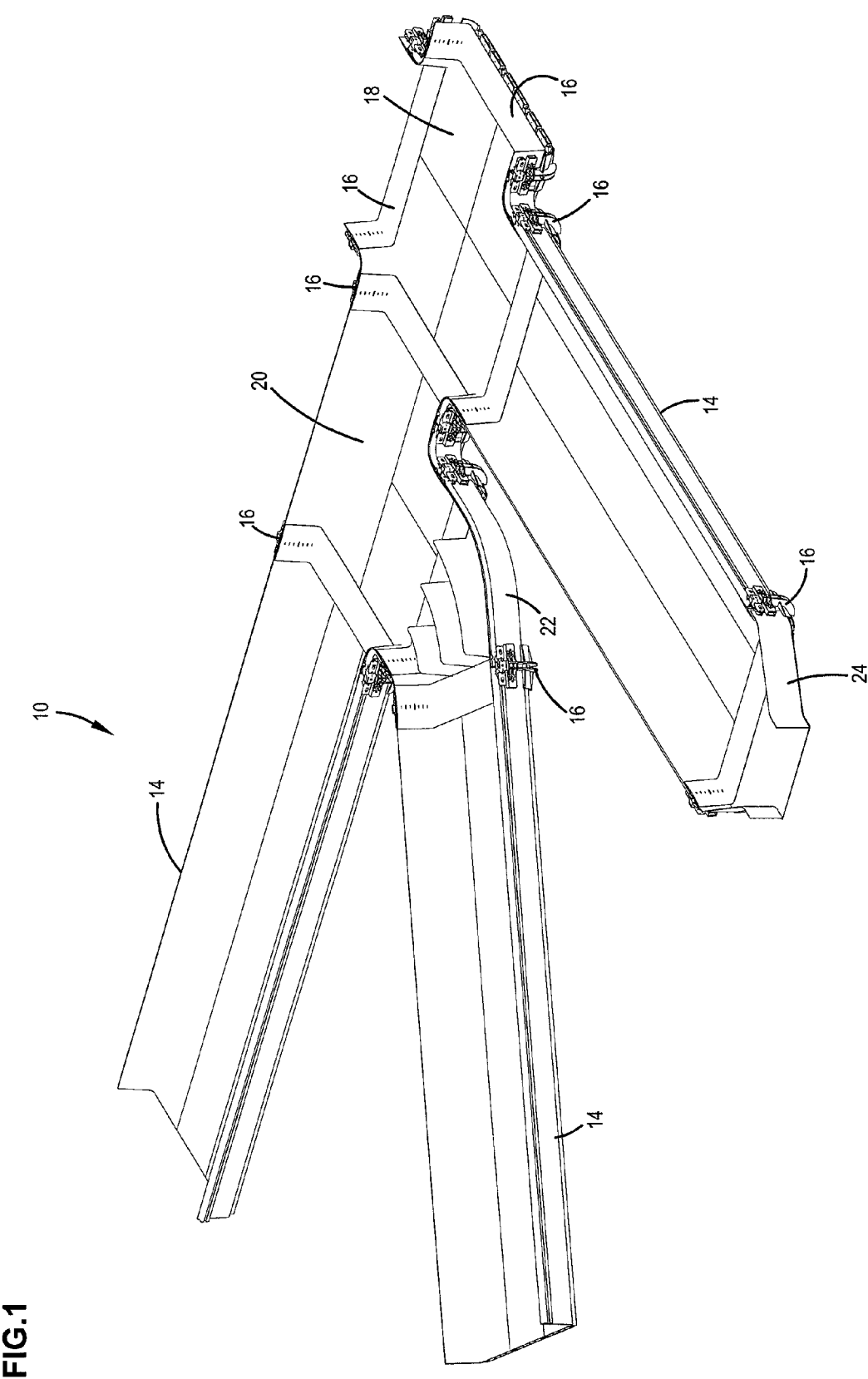
FIG. 1 is a top perspective view of a telecommunications cable management system in accordance with the present invention.
Figure 63:
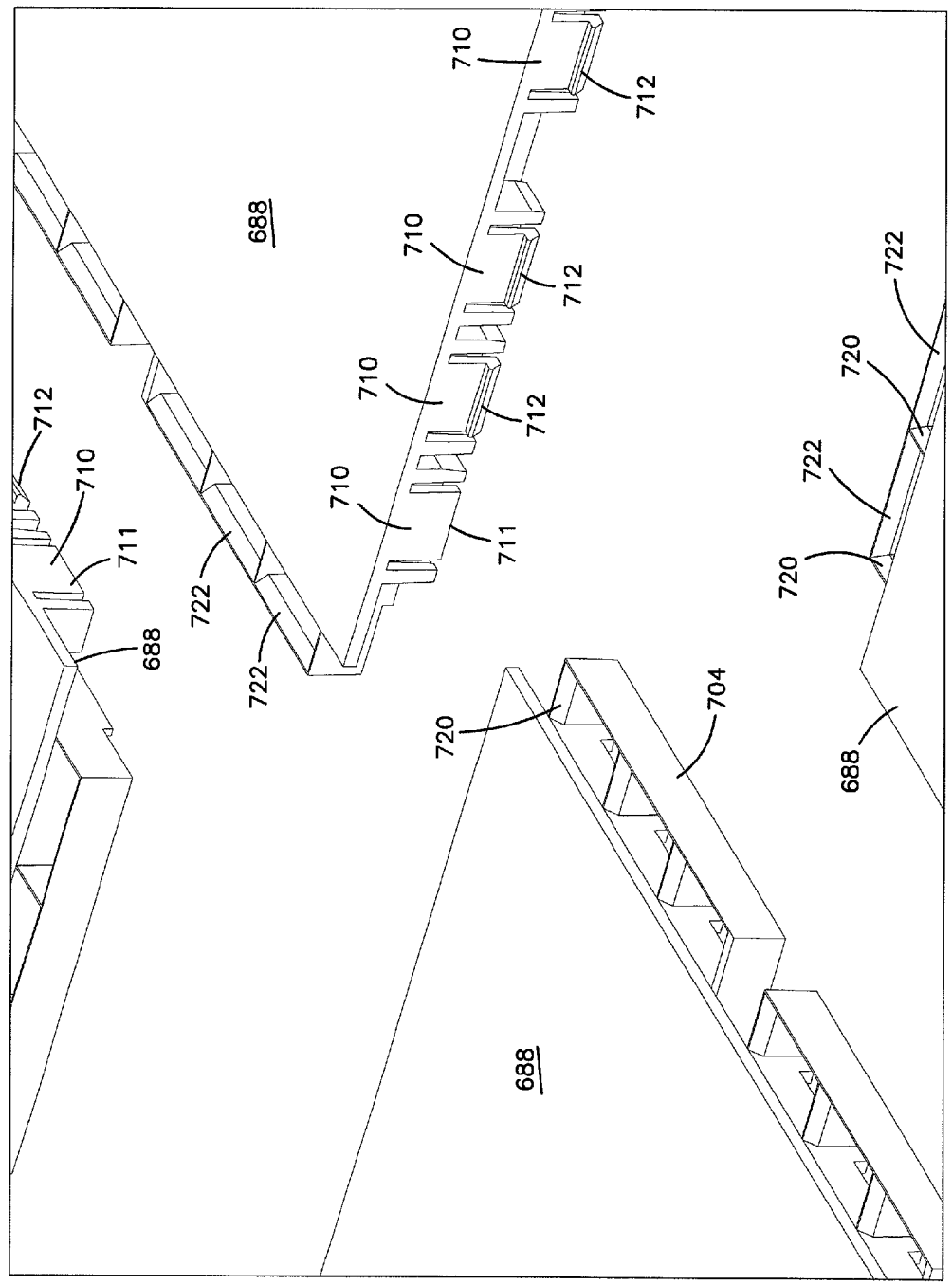
FIG. 63 is an exploded perspective view of portions of a cross component including four of the sections shown in FIG. 61.

The present invention relates to a cable management system with improved manufacturability and customization capabilities over prior art cable management systems. One aspect of the present invention is the use of sections which are assembled into trough components which are then assembled together to form the cable management system. Various components and configurations are anticipated in accordance with the present invention. Various examples of the components and configurations are illustrated in FIGS. 1-63. However, it is to be appreciated that numerous other components and configurations are possible.

Referring now to FIG. 1, a system 10 for cable management is positioned over a cabinet, a frame, bay or other equipment (not shown) which may include an array of connectors or other telecommunications equipment for connecting to the cables in system 10. System 10 is hung from the ceiling or mounted to the equipment, with various brackets and hardware.

Example system 10 includes various trough elements which together form cable pathways for holding and managing fiber optic cables. System 10 includes longitudinal trough members 14, and couplers 16 for joining the longitudinal trough members 14 to other trough elements including a cross component 18, a Tee component 20, an elbow component 22, and a reducer 24. System 10 can be expanded in various directions by adding further components 14, 16, 18, 20, 22, and 24. Other arrangements are possible for the noted components including arrangements that use less than all of the noted components, or additional components, as desired. For example, a cable exit trough can be added to allow cables to enter and exit the trough components for downward travel to equipment below trough components. U.S. Pat. No. 6,625,373, the disclosure of which is incorporated by reference, shows an example cable exit trough mountable to lateral trough member 14.

Figure 2:
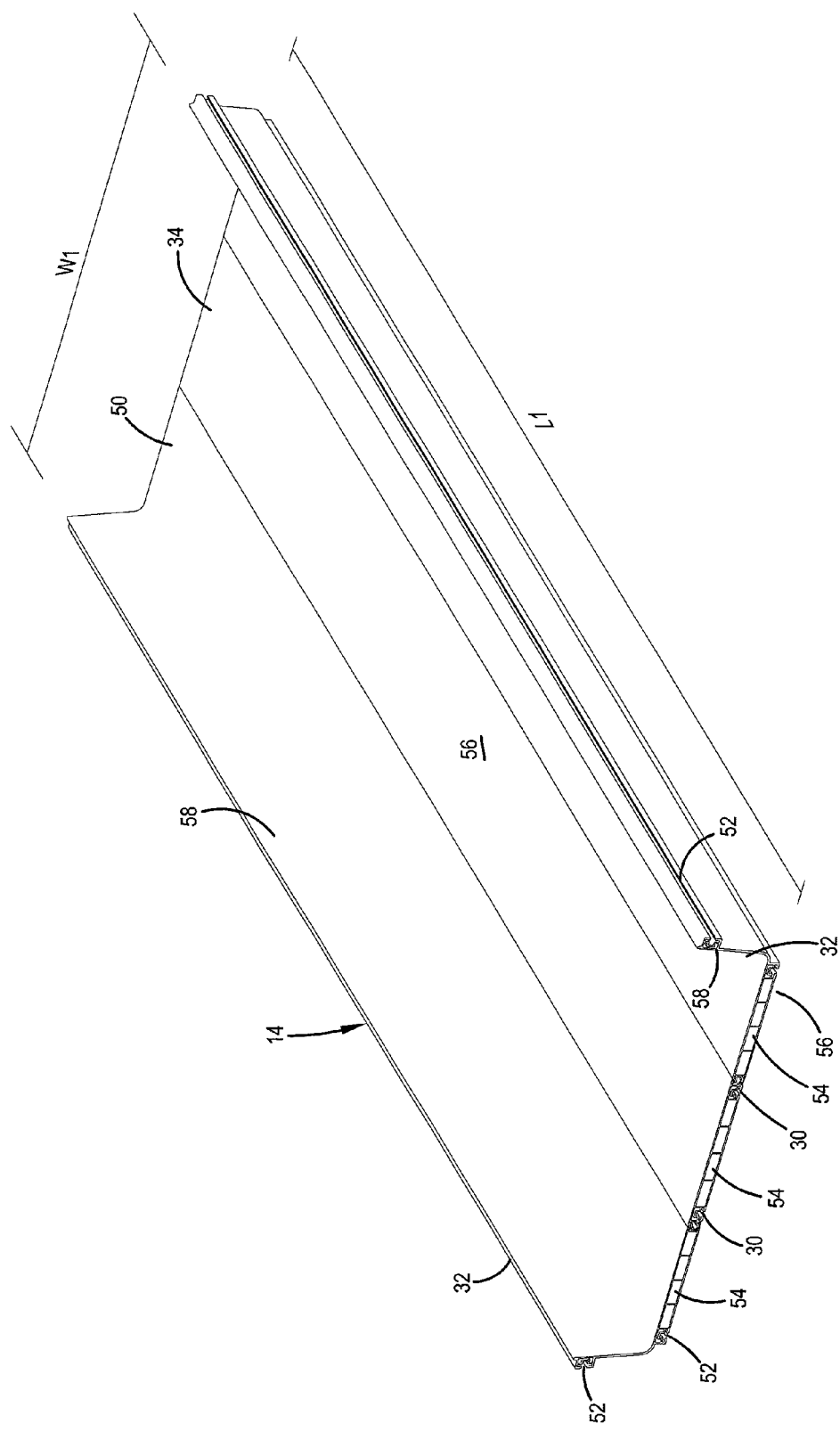
FIG. 2 is a top perspective view of a longitudinal trough member of the system of FIG. 1.
Figure 3:
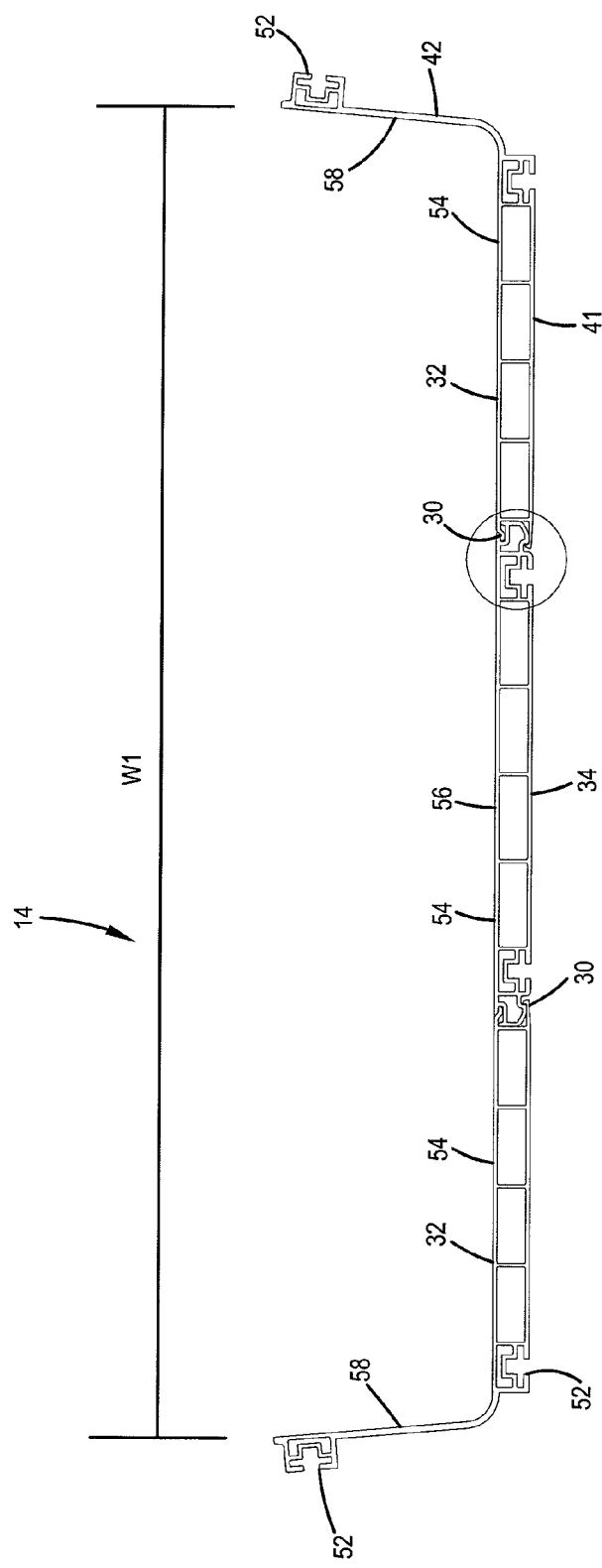
FIG. 3 is an end view of the trough member of FIG. 2.
Figure 5:
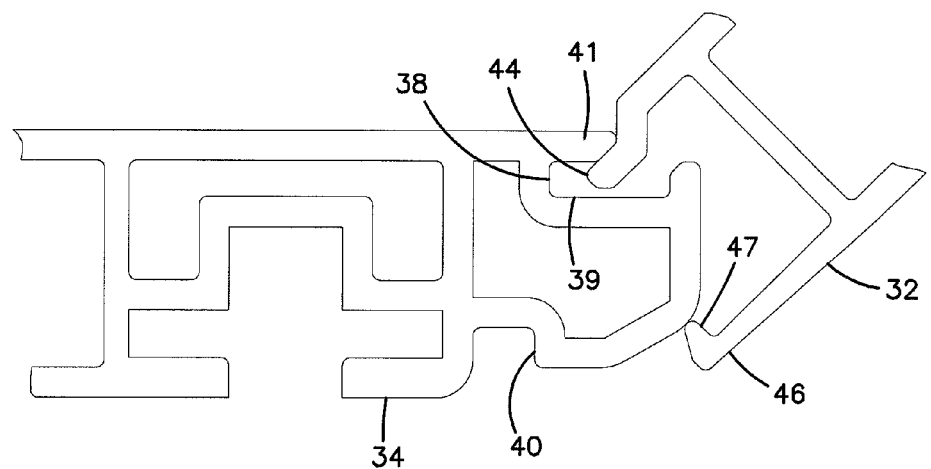
FIG. 5 is a view similar to the view FIG. 4, showing the sections during the mating operation.
Figure 4:
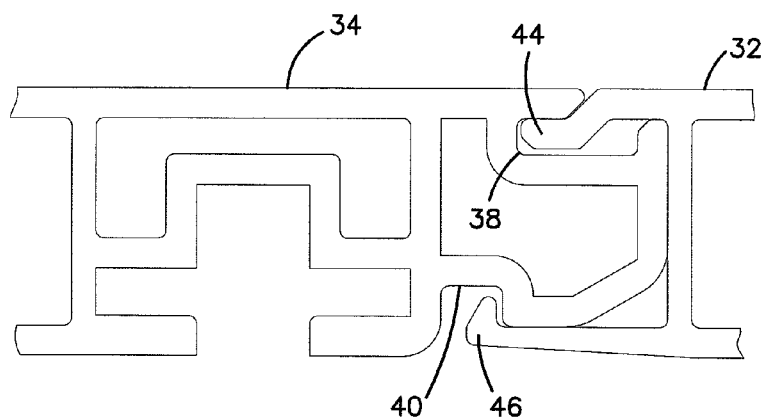
FIG. 4 is an enlarged portion of the mating arrangement between sections of the longitudinal trough member of FIGS. 2 and 3.

Referring now to FIGS. 2-5, longitudinal trough member 14 preferably has a continuous cross-section, and can be cut to the desired length $L_1$. Longitudinal trough member 14 is preferably by an extrusion process. As shown, longitudinal trough member 14 is made from separate sections assembled together to form longitudinal trough member 14. A mating arrangement 30 mounts the separate sides 32 to middle 34. In one preferred embodiment, the mating arrangement 30 includes a snap fit. FIGS. 4 and 5 show the snap fit between one of sides 32 and middle 34. As shown, mating arrangement 30 includes first and second pockets 38, 40, which receive first and second projections 44, 46, respectively. During assembly, first projection 44 is inserted into first pocket 38, and the side 32 is pivoted relative to middle 34 until second projection 46 is received in second pocket 40 to hold the side to the middle. (See FIGS. 4 and 5). First projection 44 has a bent shape which fits into first pocket 38 defined by base 39 and tab 41. Second projection 46 is flexible outward and includes a shoulder 47 which is positioned against shoulder 43 of second pocket 40. A similar mating arrangement 30 mounts the other side 32 to the other side of middle 34.

One advantage in assembling longitudinal trough member 14 from separate parts is that larger longitudinal trough members 14 can be made more easily than might be possible if the whole structure was made in a single extrusion. For example, making longitudinal trough member 14 in sizes over 12 inches across (see dimension W1 in FIGS. 2 and 3), including as much as 24 inches across or more, can be difficult to mold in a single part with an extrusion. Also, different sides 32 can be mated with different middles 34, as desired.

Longitudinal trough member 14 preferably includes structure on ends 50 for mating with other system components. As shown, longitudinal trough member 14 preferably includes attachment members 52 and pockets 54, for mating with couplers 16, as will be described below.

As shown, middle 34 of longitudinal trough member 14 is generally a planar shaped element. Sides 32 have a planar bottom portion 41, and an upstanding side portion 42. If desired, upstanding side portions 42 can be separate side elements mounted to planar bottom portion 41, such as with a snap mount. U.S. Pat. No. 6,631,875 discloses various arrangements including separate side elements. The disclosure of U.S. Pat. No. 6,631,875 is hereby incorporated by reference.

As shown in FIGS. 2 and 3, longitudinal trough member 14 defines a bottom 56 and upstanding side walls 58 for holding cables within an interior. Sufficient numbers of longitudinal trough members 14 are included in system 10 to define the appropriate cable routing pathways. Cross components 18 and Tee components 20 allow for side exits in a horizontal direction from the longitudinal pathways defined by longitudinal trough members 14. Couplers 16 join longitudinal trough members 14 to cross components 18 and Tee components 20 as shown in FIG. 1. Elbows 22 can also be used to change the cable pathway direction between two longitudinal trough members 14, or between a longitudinal trough member 14 and one of the cross components 18 or Tee components 20.

Figure 6:
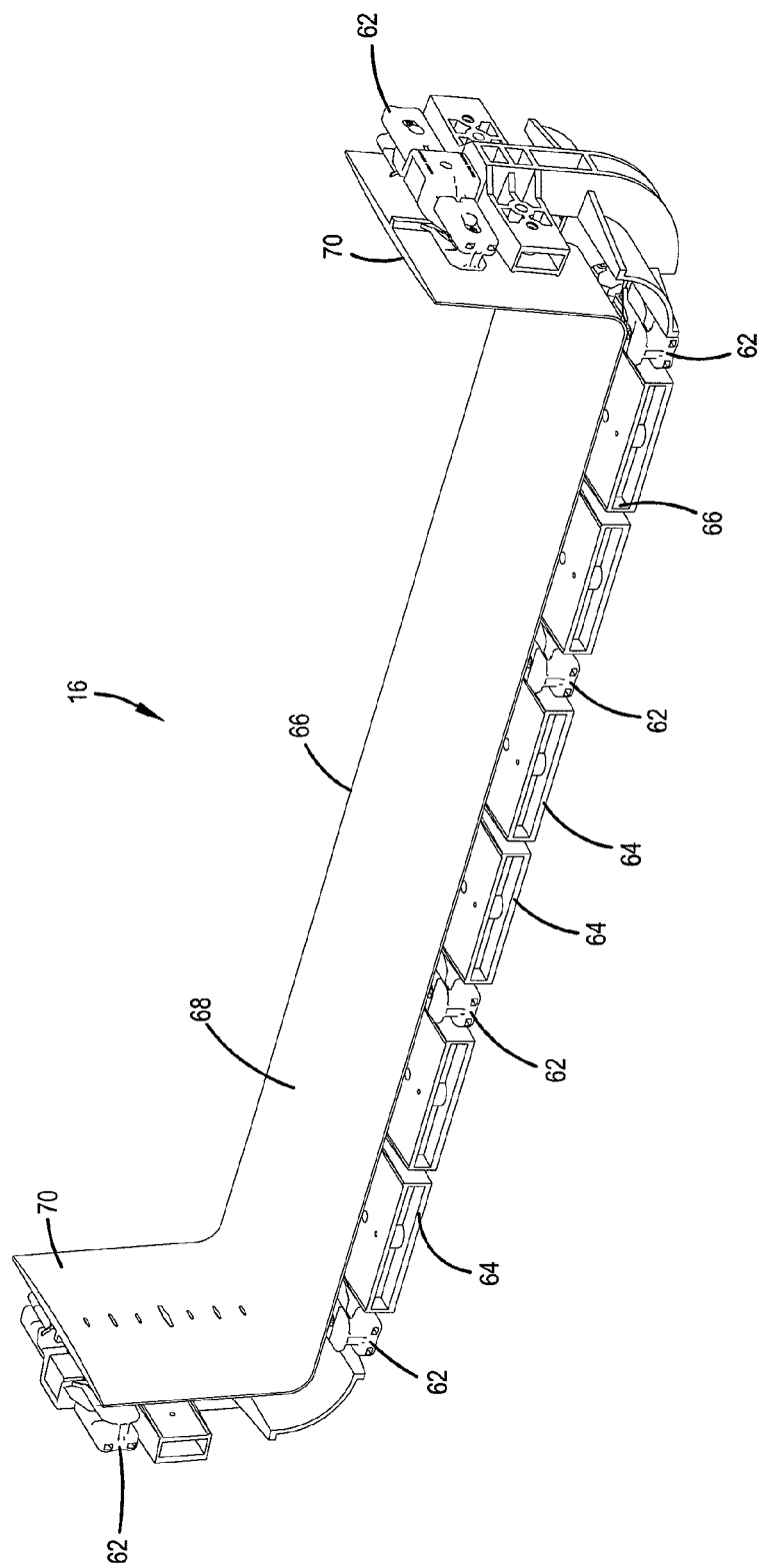
FIG. 6 is a top perspective view of one of the couplers of the system of FIG. 1.
Figure 7:
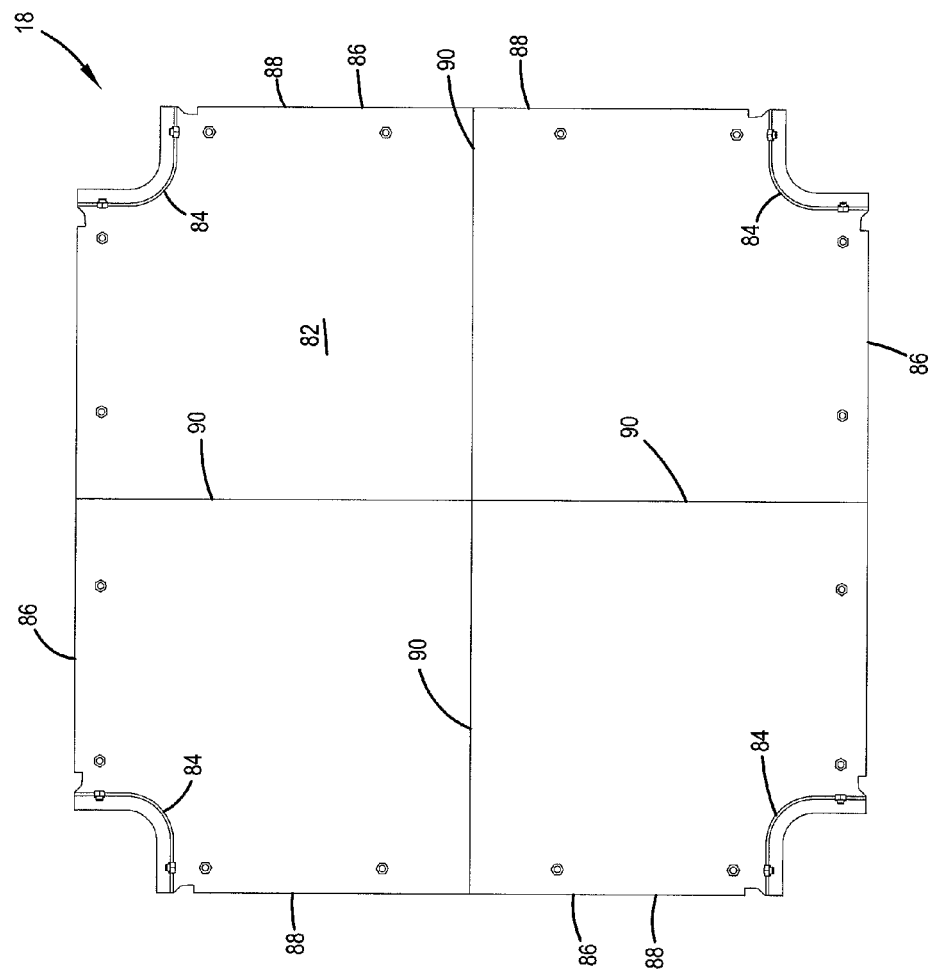
FIG. 7 is a top view of the cross component of the system of FIG. 1.
Figure 8:
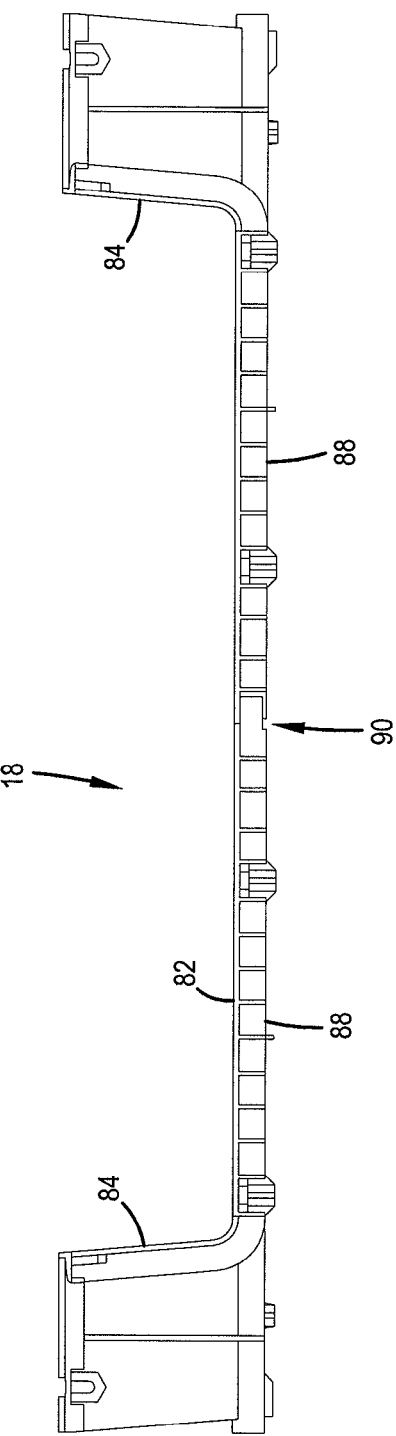
FIG. 8 is a side view of the cross component of FIG. 7.
Figure 9:
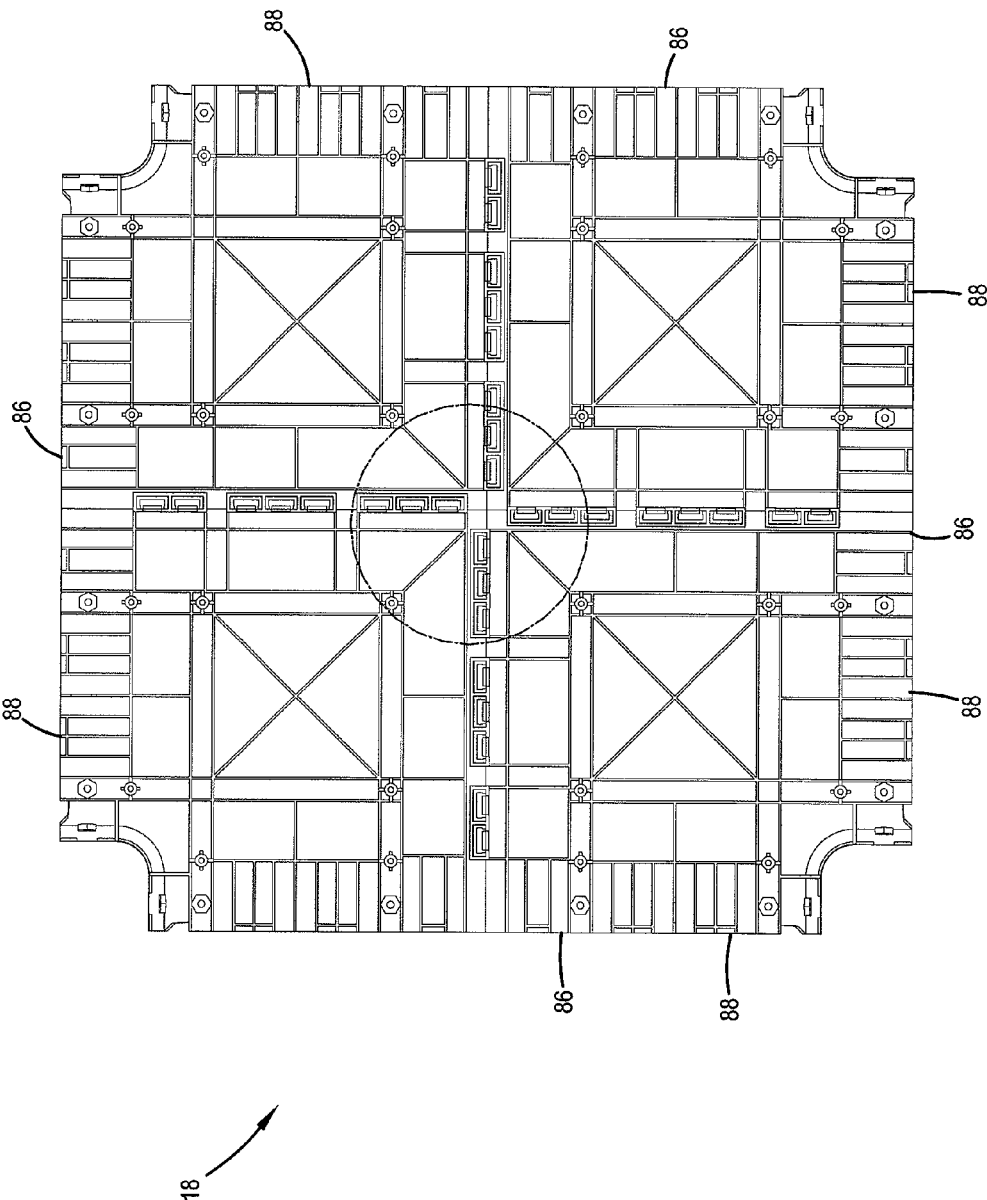
FIG. 9 is a bottom view of the cross component of FIG. 7.
Figure 10:
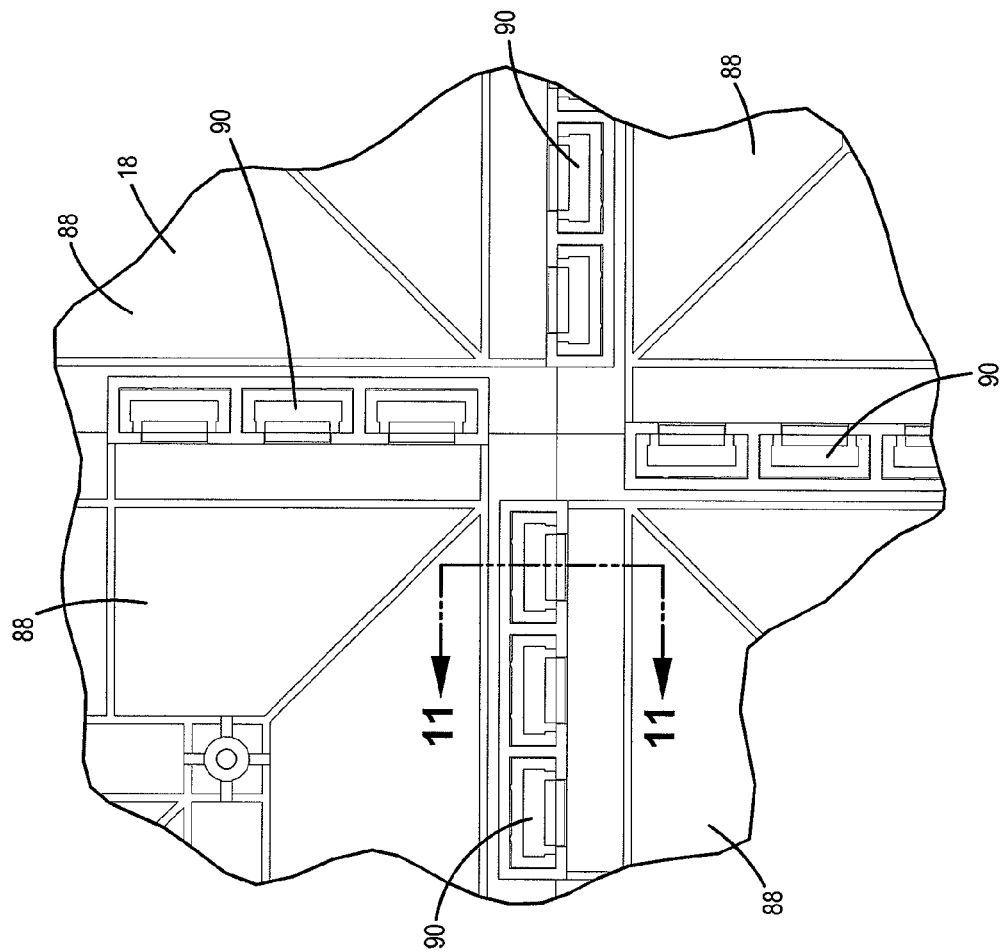
FIG. 10 is an enlarged portion of the view of FIG. 9.
Figure 11:
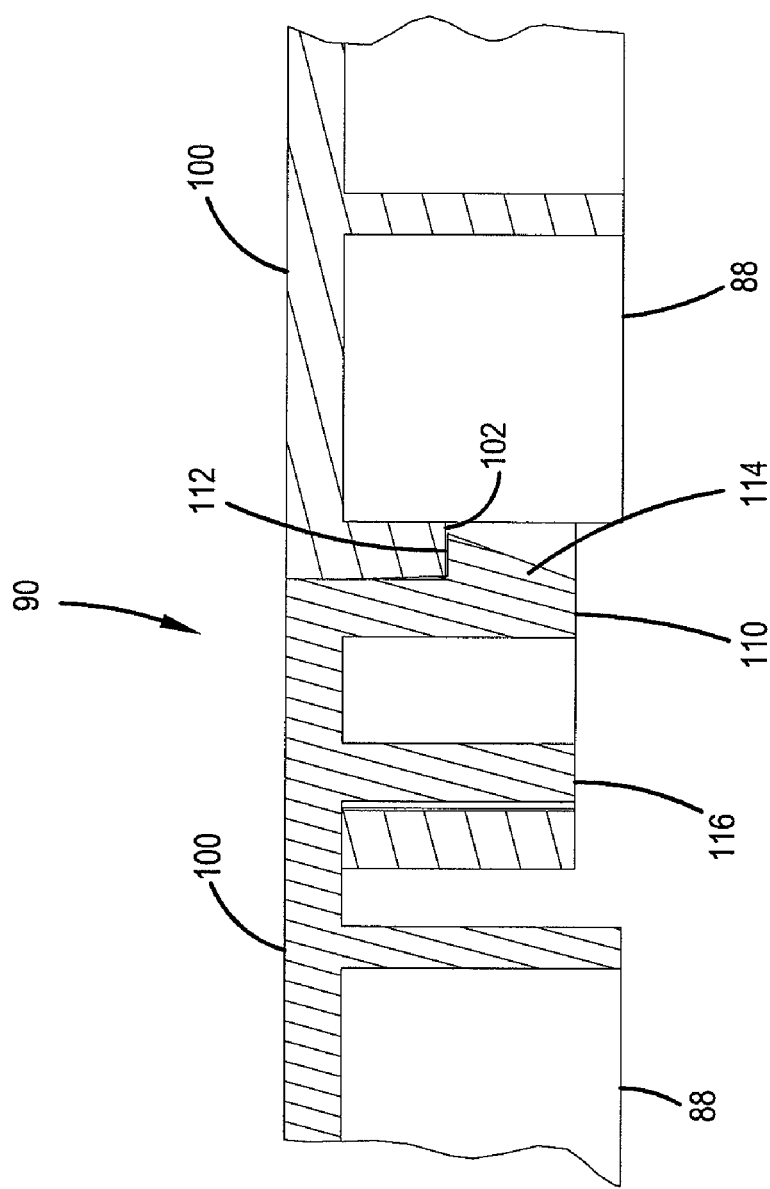
FIG. 11 is a cross-sectional side view of the mating arrangement between two sections of the cross component.
Figure 12:
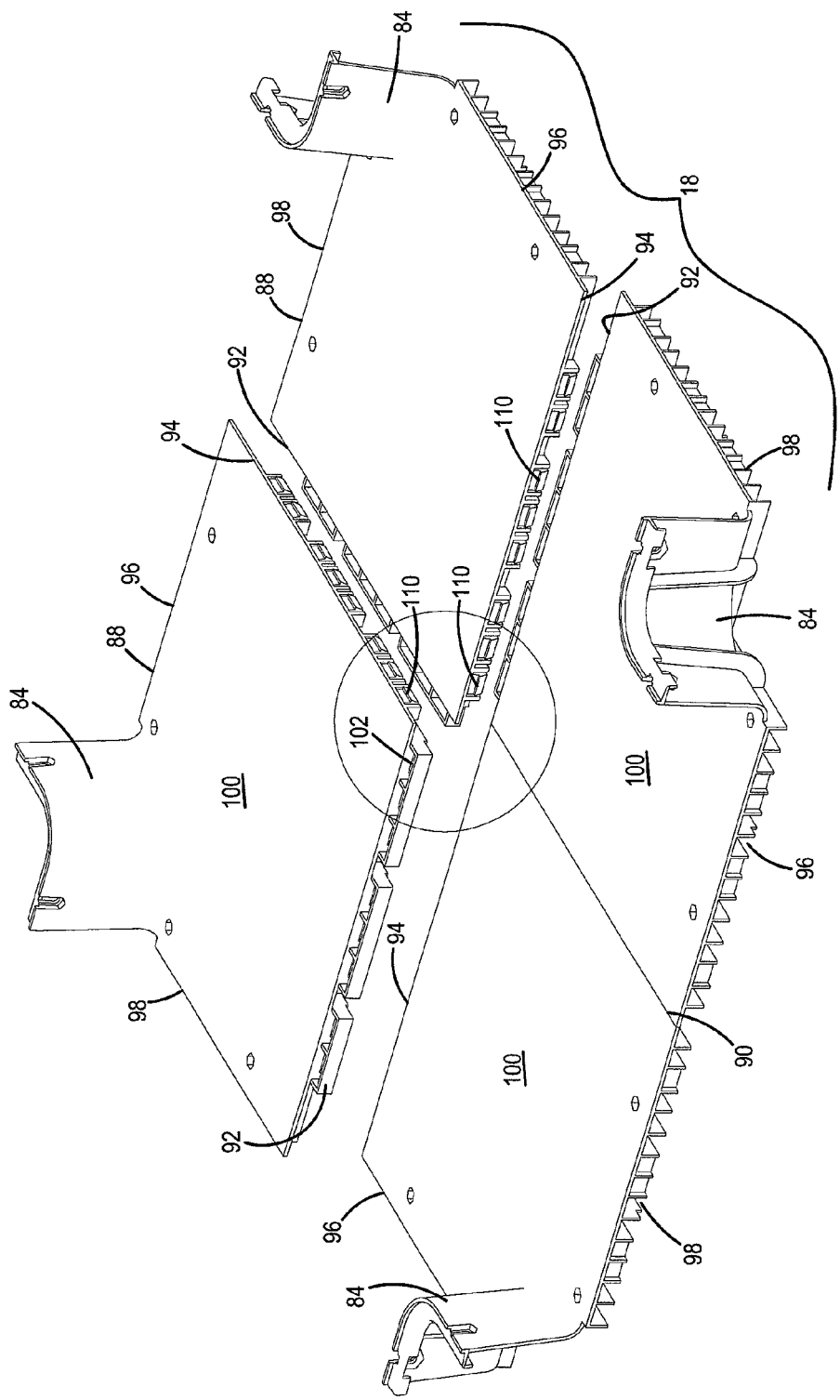
FIG. 12 is a top perspective view of the cross component of FIG. 7 showing two sections separated from the rest.
Figure 13:
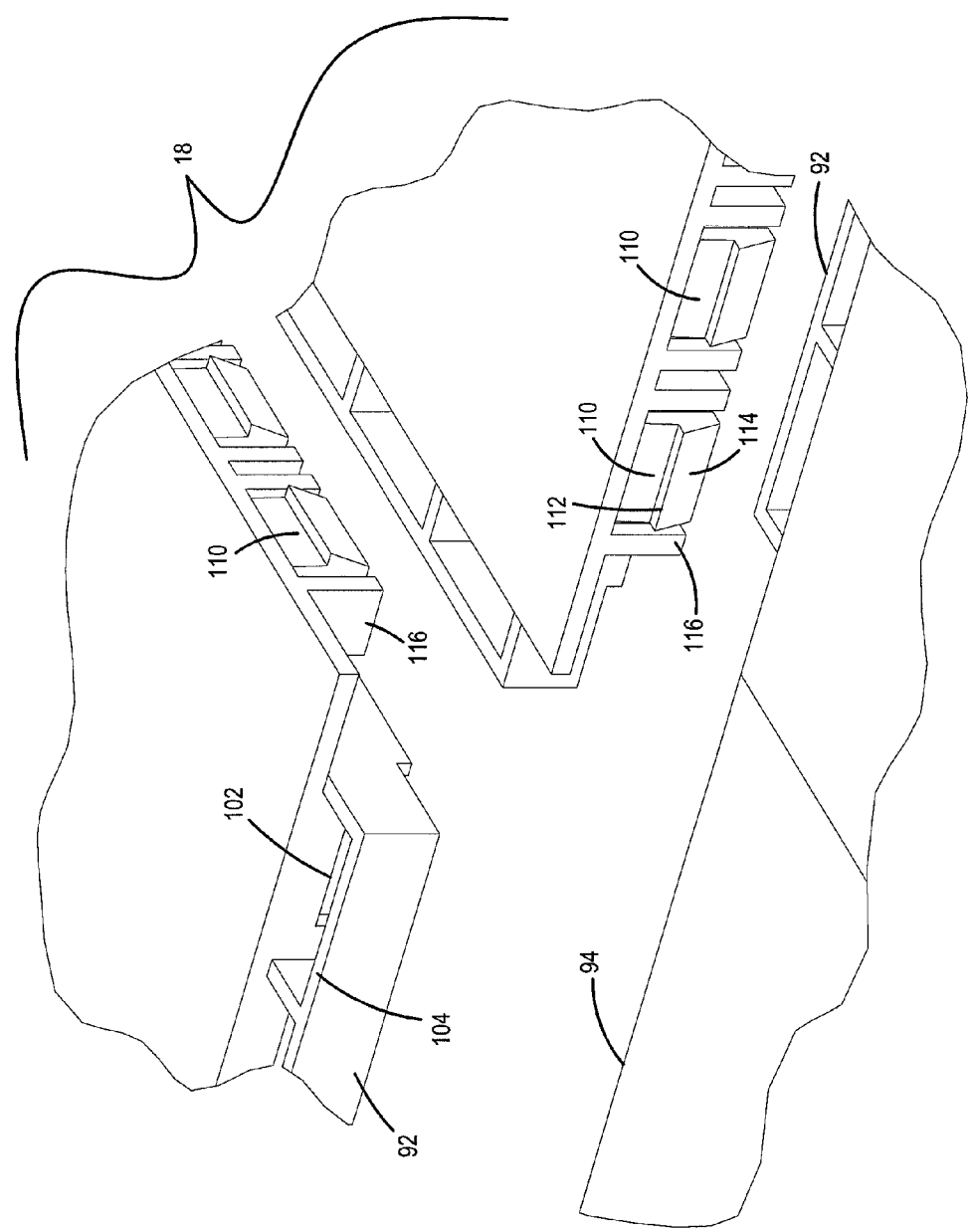
FIG. 13 is an enlarged portion of the view of FIG. 12.
Figure 14:
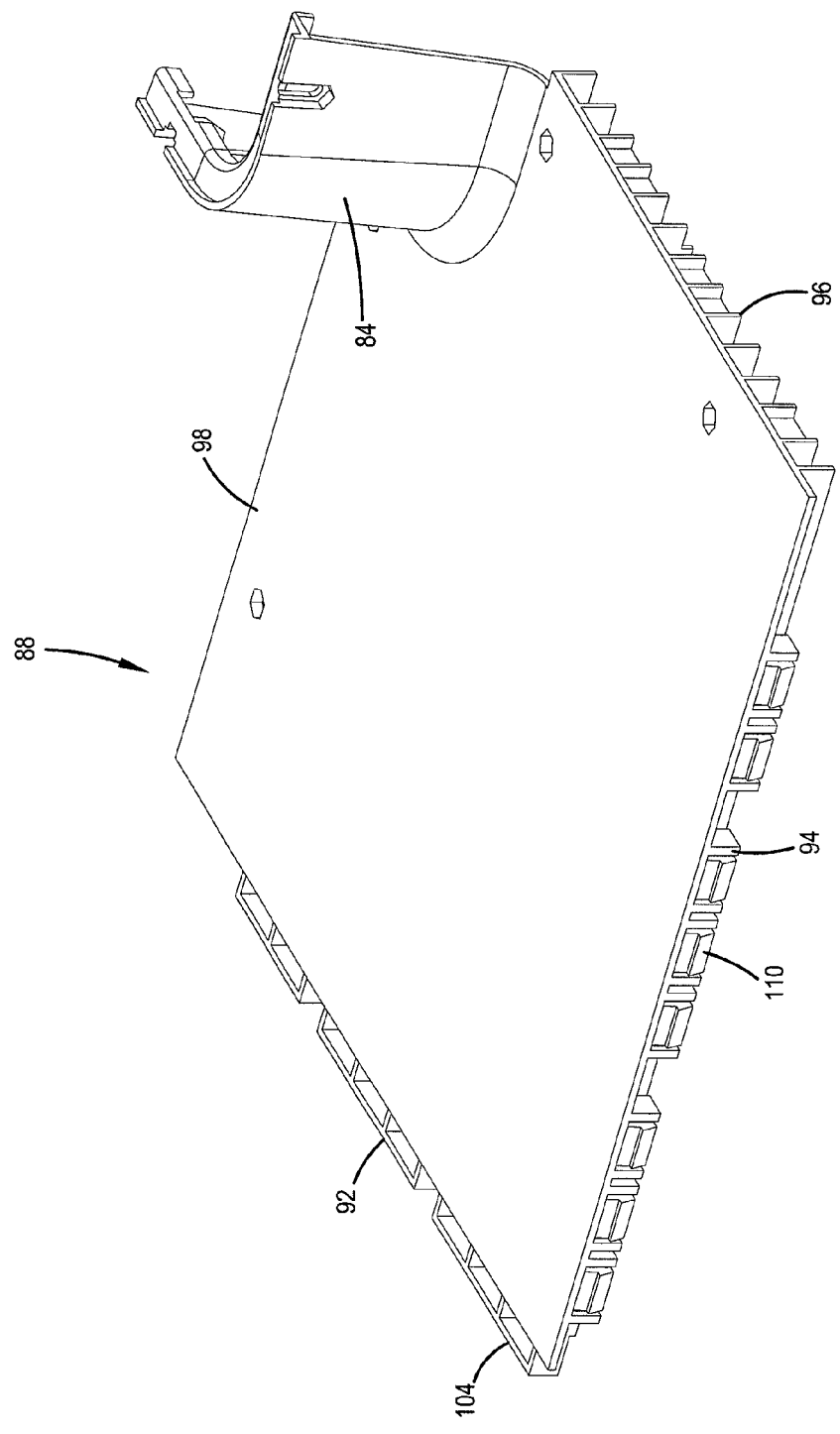
FIG. 14 is a top perspective view of one of the sections of the cross component of FIG. 7.
Figure 15:
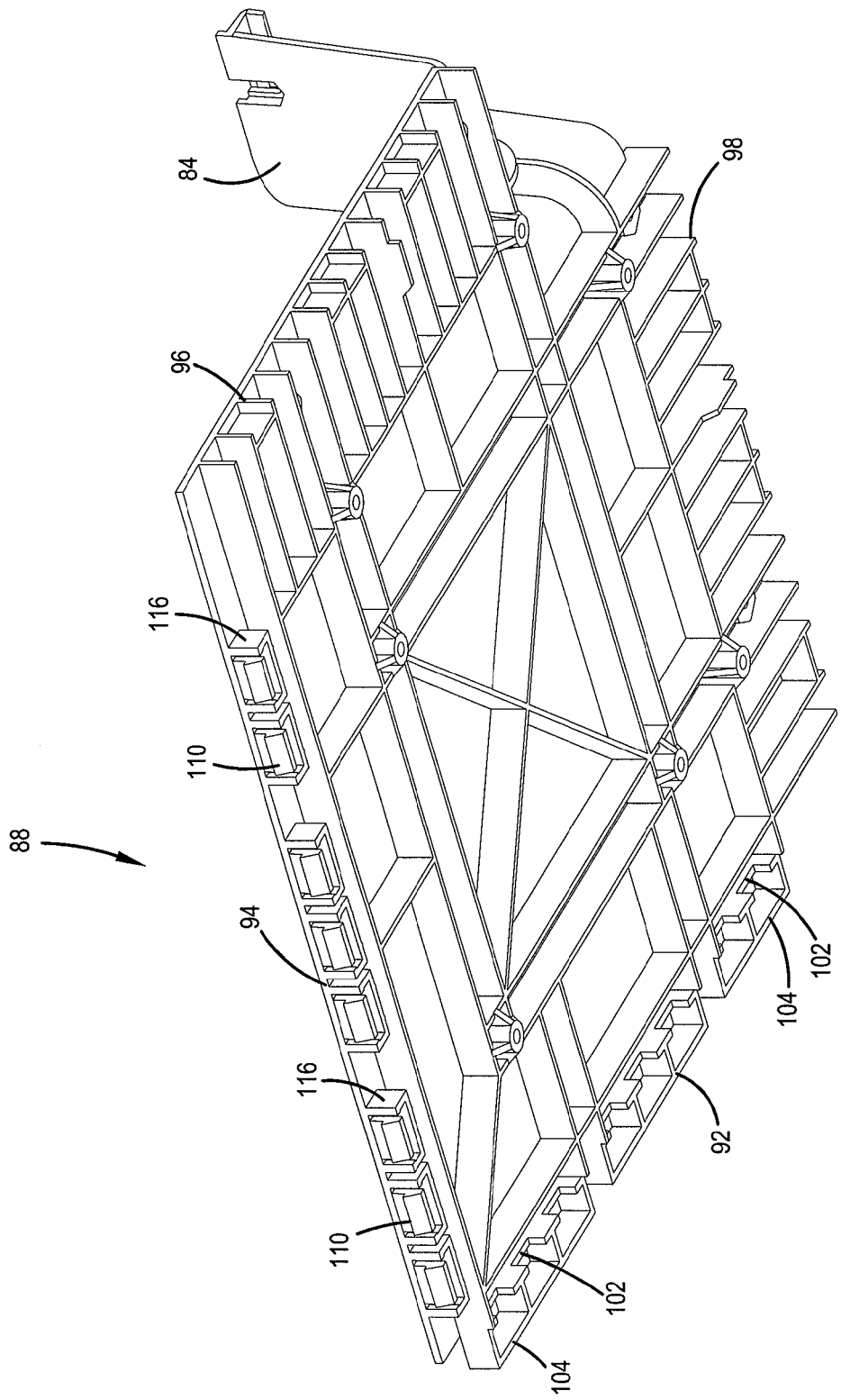
FIG. 15 is a bottom perspective view of the section of FIG. 14.
Figure 16:
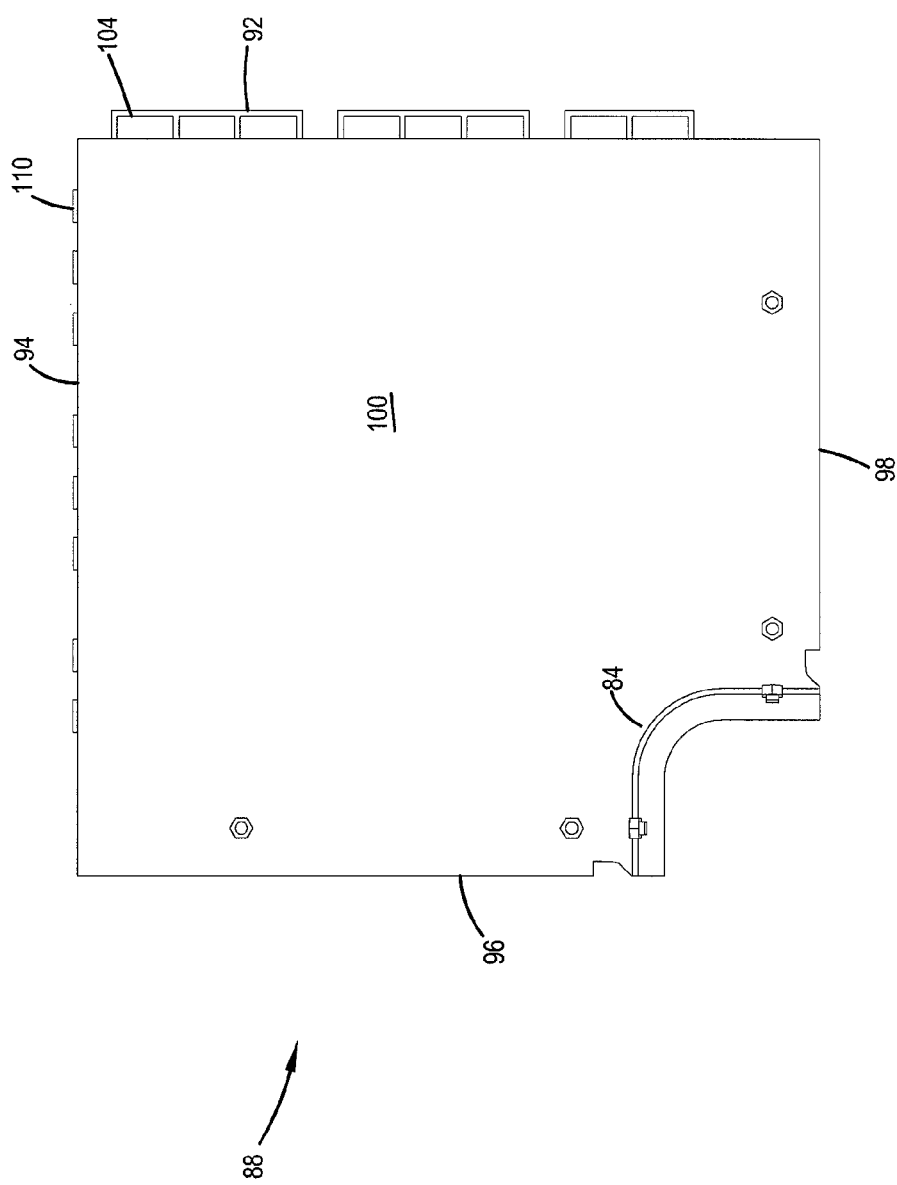
FIG. 16 is a top view of the section of FIG. 14.
Figure 17:
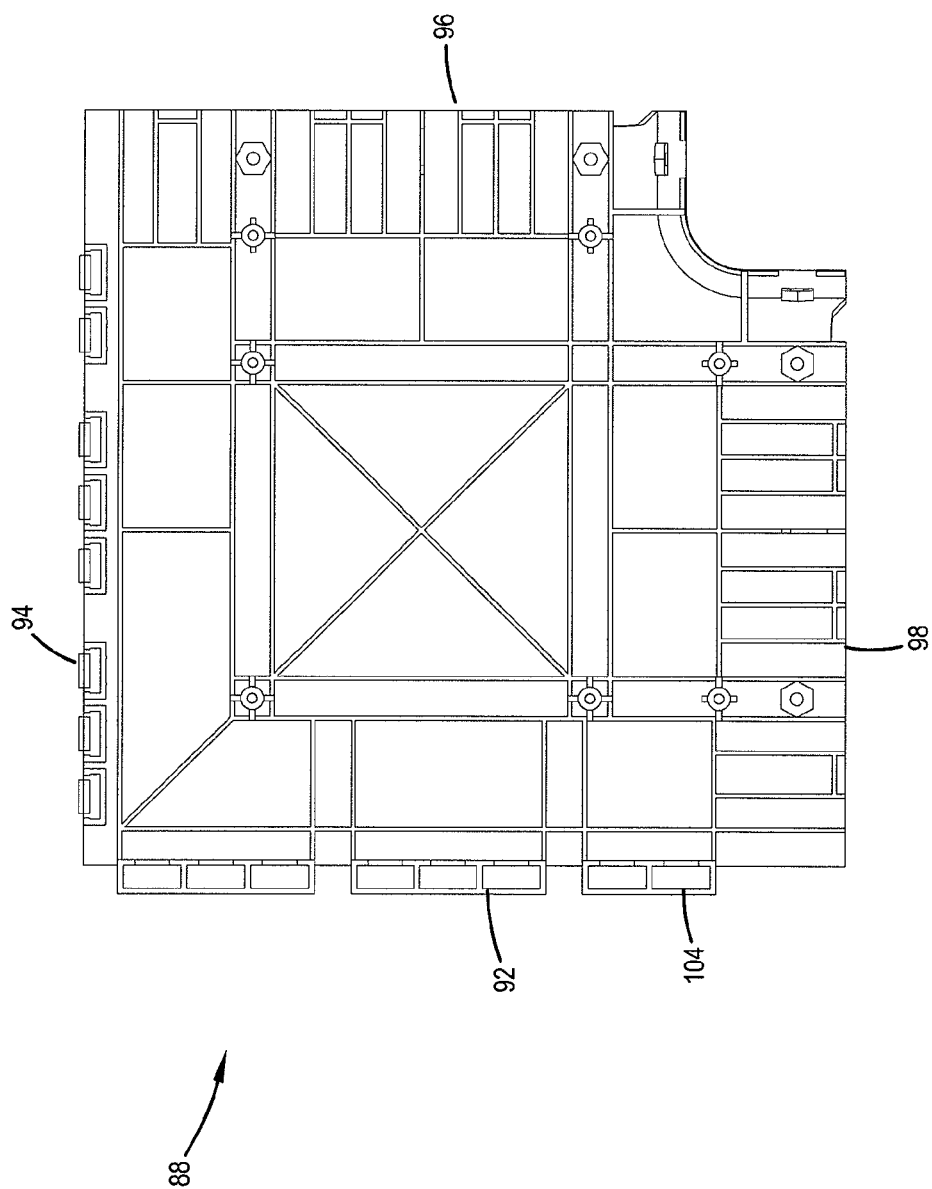
FIG. 17 is a bottom view of the section of FIG. 14.
Figure 18:
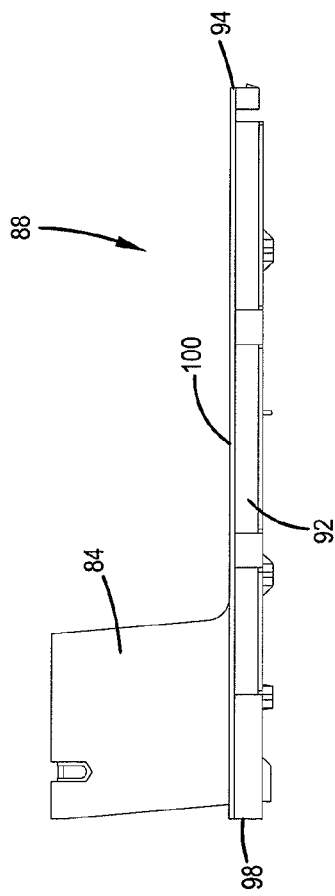
FIG. 18 is a first side view of the section of FIG. 14.
Figure 19:
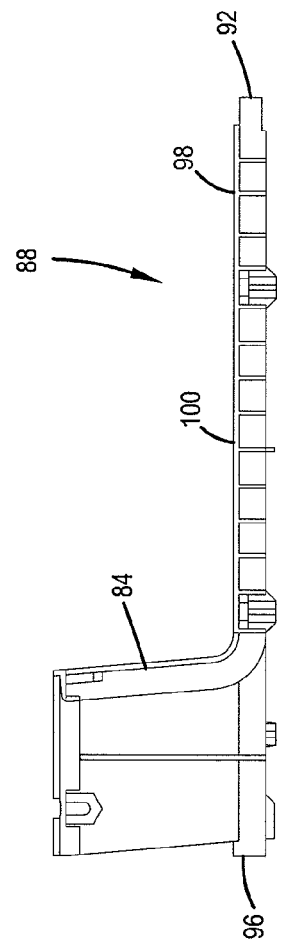
FIG. 19 is a further side view of the section of FIG. 14.
Figure 20:
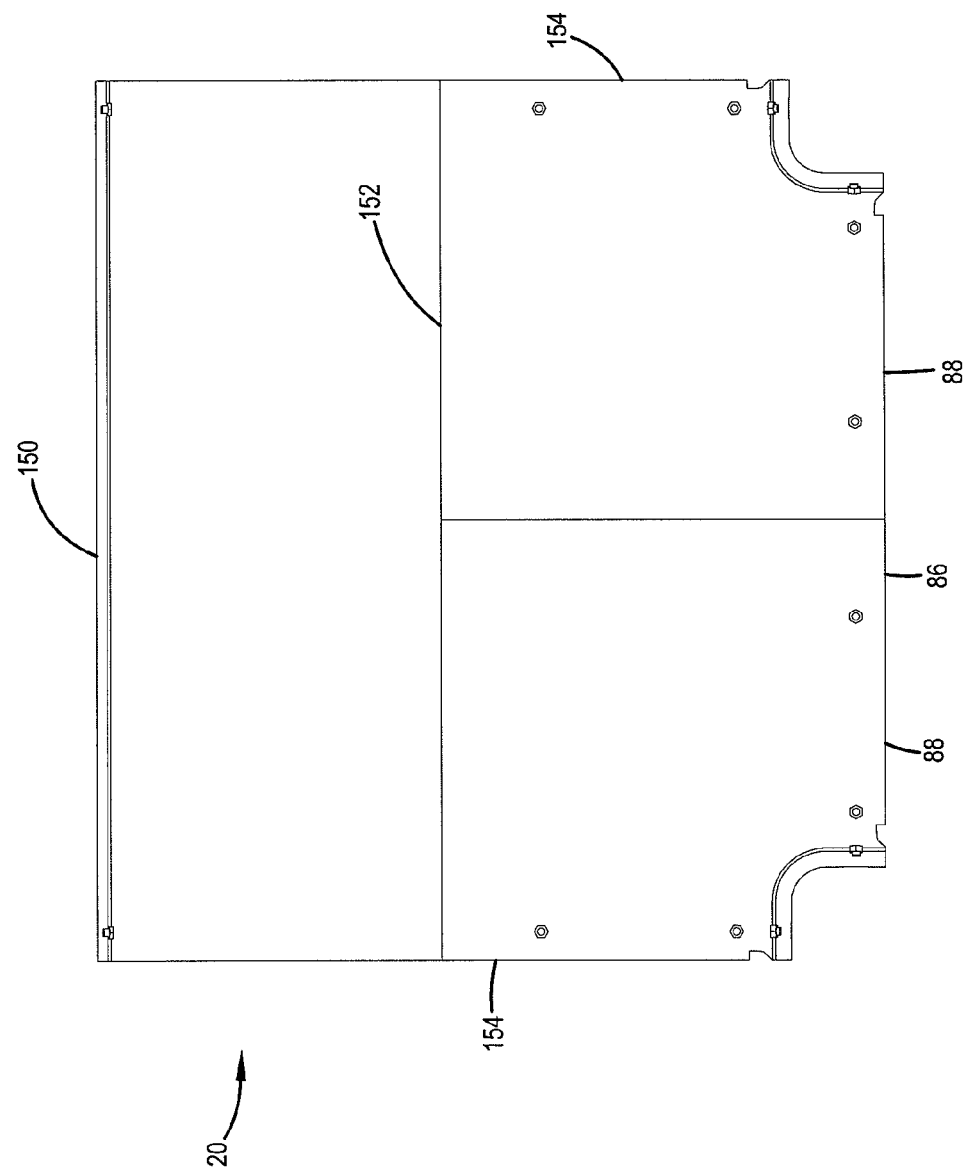
FIG. 20 is a top view of the Tee component of the system of FIG. 1.
Figure 23:
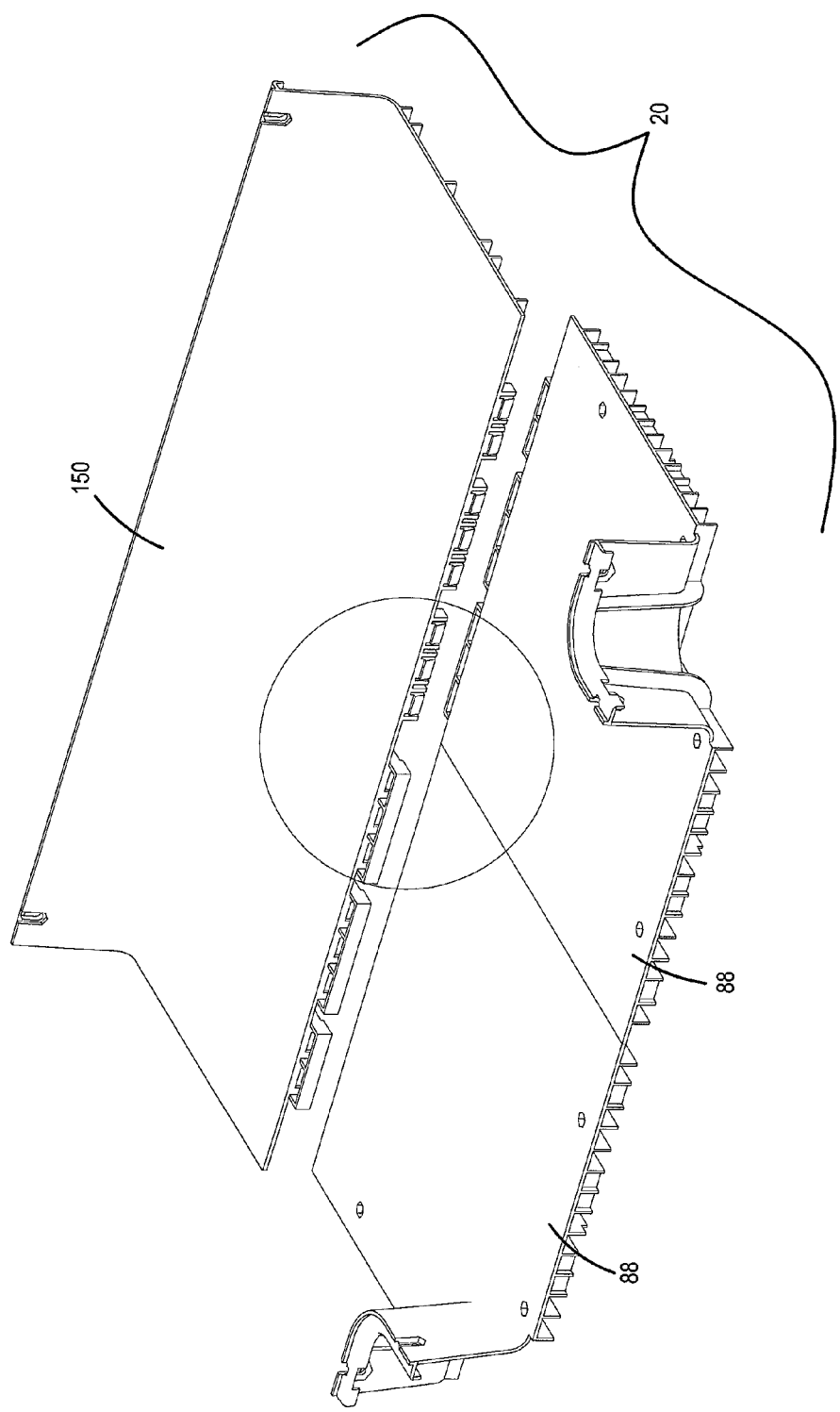
FIG. 23 is a top perspective view of the Tee component of FIG. 20 showing one section separated from the rest.
Figure 24:
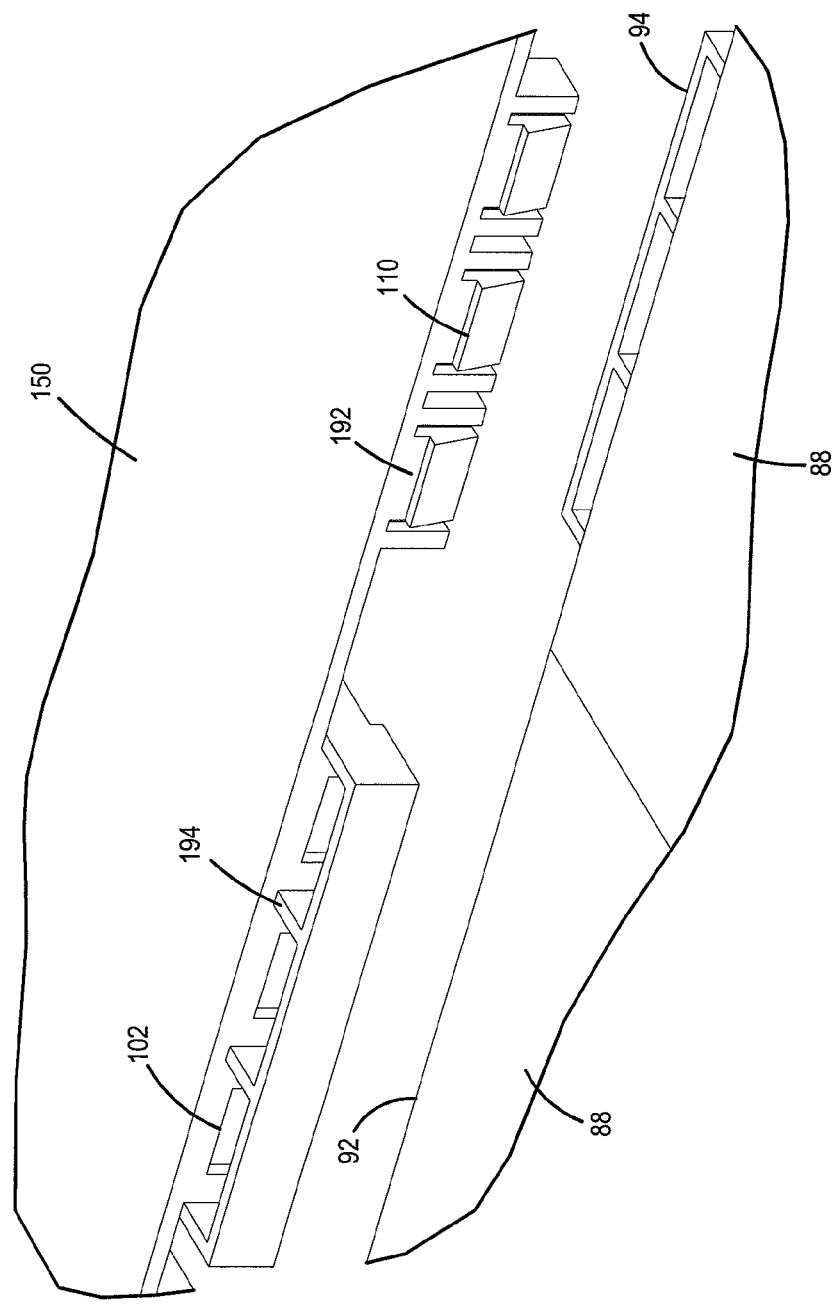
FIG. 24 is an enlarged portion of the view of FIG. 23.

Now with reference to FIG. 6, coupler 16 includes at least one locking element 62 for mating with an attachment member 52 of longitudinal trough member 14. Further details of locking of coupler 16 to longitudinal trough member 14 are described in U.S. Pat. No. 6,715,719, the disclosure of which is incorporated by reference. Other couplers can be used such as the couplers disclosed in U.S. Pat. No. 5,752,781, the disclosure of which is incorporated by reference. The couplers of U.S. Pat. No. 5,752,781 use fasteners to mount the system components. Still further couplers usable in system 10 are disclosed in U.S. Pat. Nos. 5,067,678 and 5,316,243, the disclosures of which are incorporated by reference. The system components matable with couplers 16 or other couplers may need appropriately configured mating structures, or be capable of attachment by other means to the couplers, such as by springs or fasteners, as in the prior noted patents.

Coupler 16 also includes projections 64 on both ends 66 for receipt in pockets 54 of longitudinal trough members 14. Coupler defines a bottom 68 and upstanding side walls 70 for holding cables within an interior.

Referring now to FIGS. 7-19, further features of cross component 18 are shown. Cross component 18 includes a base 82, four upstanding side walls 84, and four ends 86. Ends are connectable to couplers 16. Base 82 and side walls 84 define cable pathways across cross component 18. Side walls 84 have a convexly curved shape to provide bend radius protection for the cables that may bend around within cross component 18 from one end 86 to an adjacent end 86. Ends 86 are mountable to couplers 16, or other couplers configured to lock to cross component 18.

Cross component 18 is preferably assembled from separate parts or sections 88. A mating arrangement 90 connects the sections 88 together. Each section 88 includes edges 92, 94, 96, 98, a base 100, and one side wall 84. Mating arrangement 90 mates edges 92 to edges 94 of adjacent sections 88. Edges 96, 98 form ends 86. In the illustrated embodiment, cross component 18 is made from four identical sections 88. One advantage of such a construction is that the mold for making component 18 out of moldable materials does not have to be as large as the mold would need to be to mold component 18 as a single integral part.

Mating arrangement 90 includes a shoulder 102 on edge 92, and a flexible tab 110 on edge 94. Tab 110 includes an edge surface 112 which engages shoulder 102. Tab 110 also includes a ramp 114 for allowing tab 110 to clear shoulder 102, so edge surface 112 can engage shoulder 102. Preferably, a plurality of mating shoulders 102 and tabs 110 are provided along edges 92, 94, respectively. A u-shaped projection 116 surrounds tab 110. An enclosure 104 on edge 92 surrounds projection 116 when mated. To mount one section 88 to another section 88, edge 94 is positioned vertically above edge 92. Tabs 110 and projections 116 enter enclosure 104, until edge 112 engages shoulder 102. In one method of assembly, two sections are mated together, and two further sections are mated together, then the two mated portions are mated together by rotating the two mated portions so that the respective shoulders 102 and tabs 110 are mated between the two mated portions.

Referring now to FIGS. 20-24, Tee component 20 is formed from two sections 88 as described above, and a longitudinal section 150. Sections 88 snap together as noted above. Sections 88 snap to longitudinal section 150 with a mating arrangement 152, including flexible tabs 110 along edge portion 192, and shoulders 102 along edge portion 194, of the types as noted above. The mated sections 88 are rotated relative to longitudinal section 150 in order for the shoulders 102 and tabs 110 to be mated. With this construction, sections 88 can be used to assemble cross component 18 or Tee component 20. Tee component 20 has three ends, ends 86 of the type noted above, and opposite ends 154, all of which are mountable to couplers 16, or other couplers configured to lock to Tee component 20.

Figure 25:
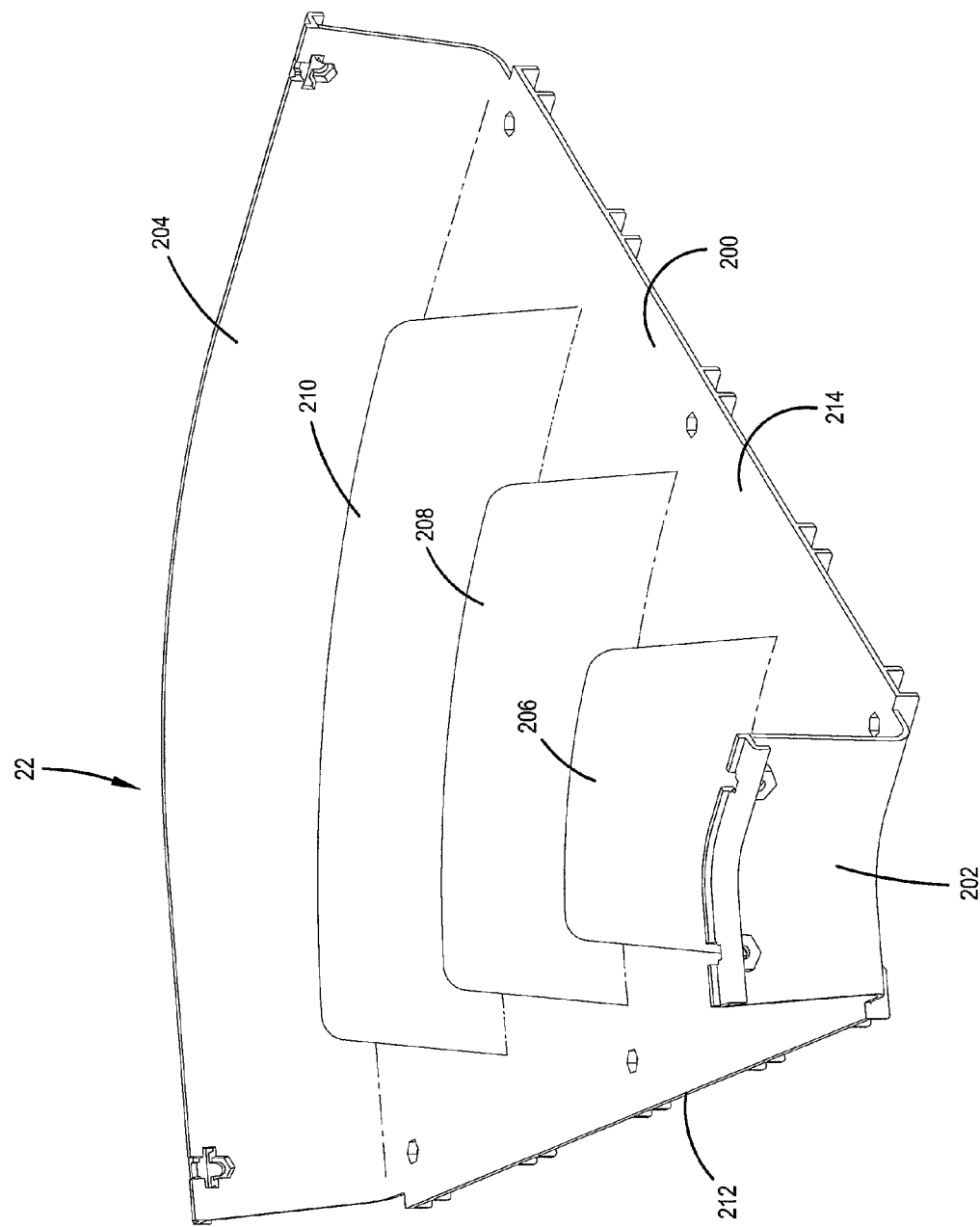
FIG. 25 is a top perspective view of the elbow component of the system of FIG. 1.
Figure 26:
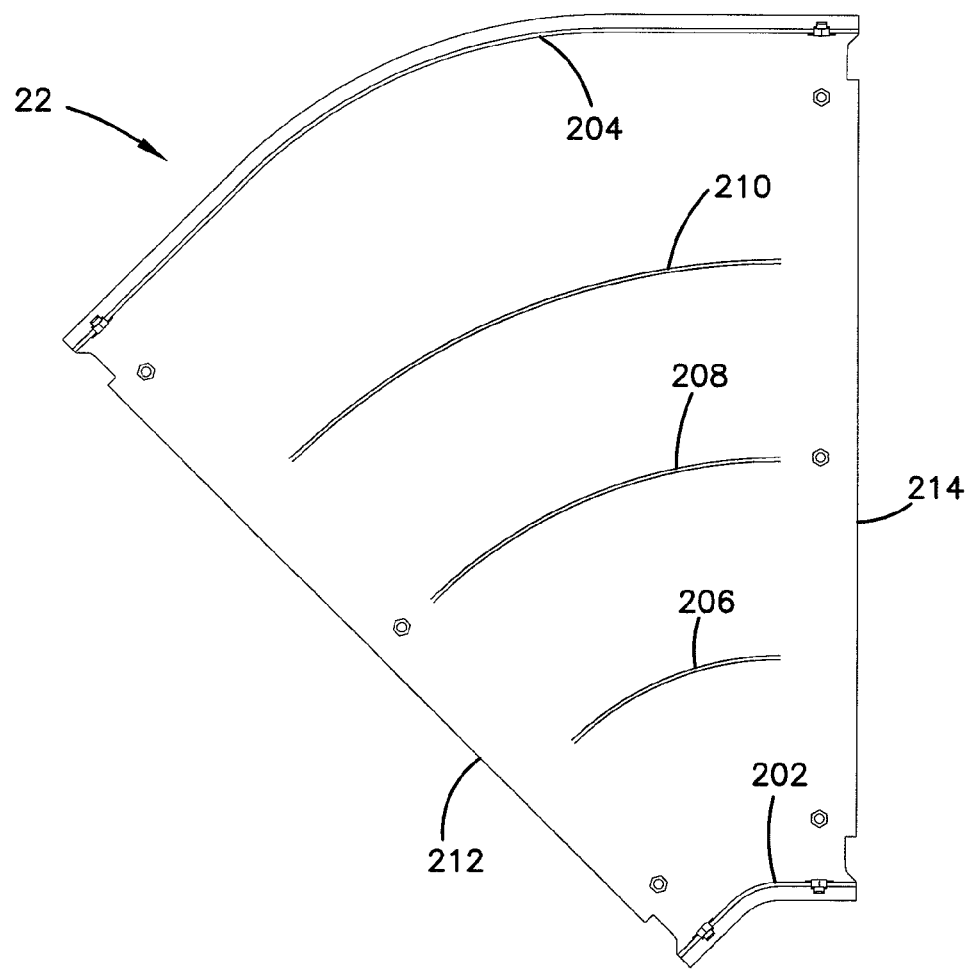
FIG. 26 is a top view of the elbow component of FIG. 25.
Figure 27:
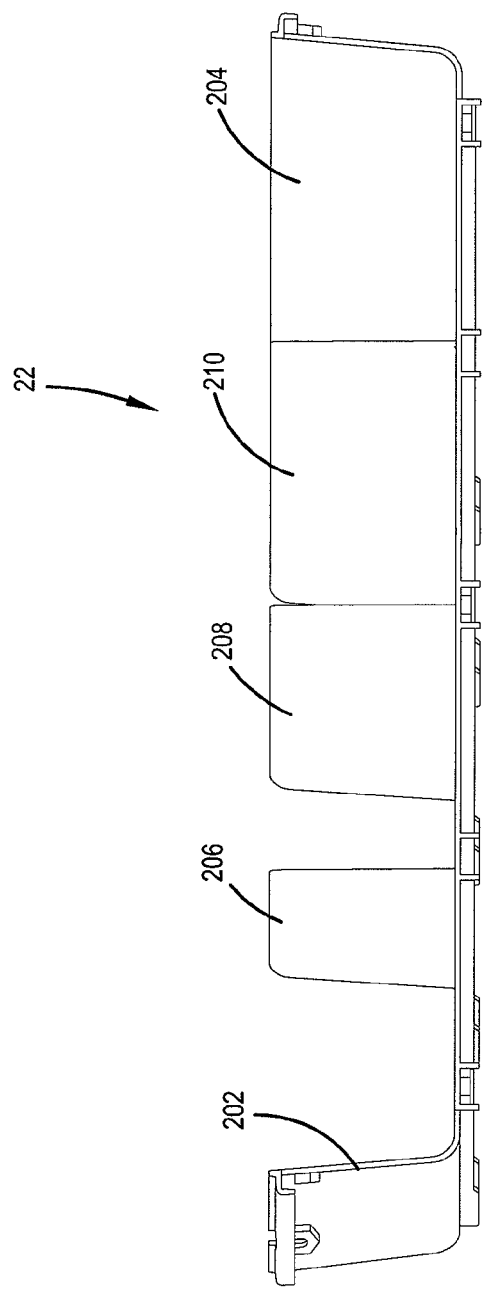
FIG. 27 is a side view of the elbow component of FIG. 25.

Referring now to FIGS. 25-27, elbow component 22 is shown in further detail. Elbow component 22 includes a base 200, and upstanding inner side wall 202 and outer side wall 204. Edges 212 and 214 connect to couplers 16. Edges 212 and 214 are at an angle to one another, such as at an angle of about 45 degrees. Such a construction allows for a change of direction of the cable pathway between components connected at each end. Two can be used for a 90 degree elbow. In the illustrated embodiment, curved guide walls or fins 206, 208, 210 are positioned in the interior of elbow to help guide the cables and help keep the cables from bunching up against inner side wall 202.

Figure 28:
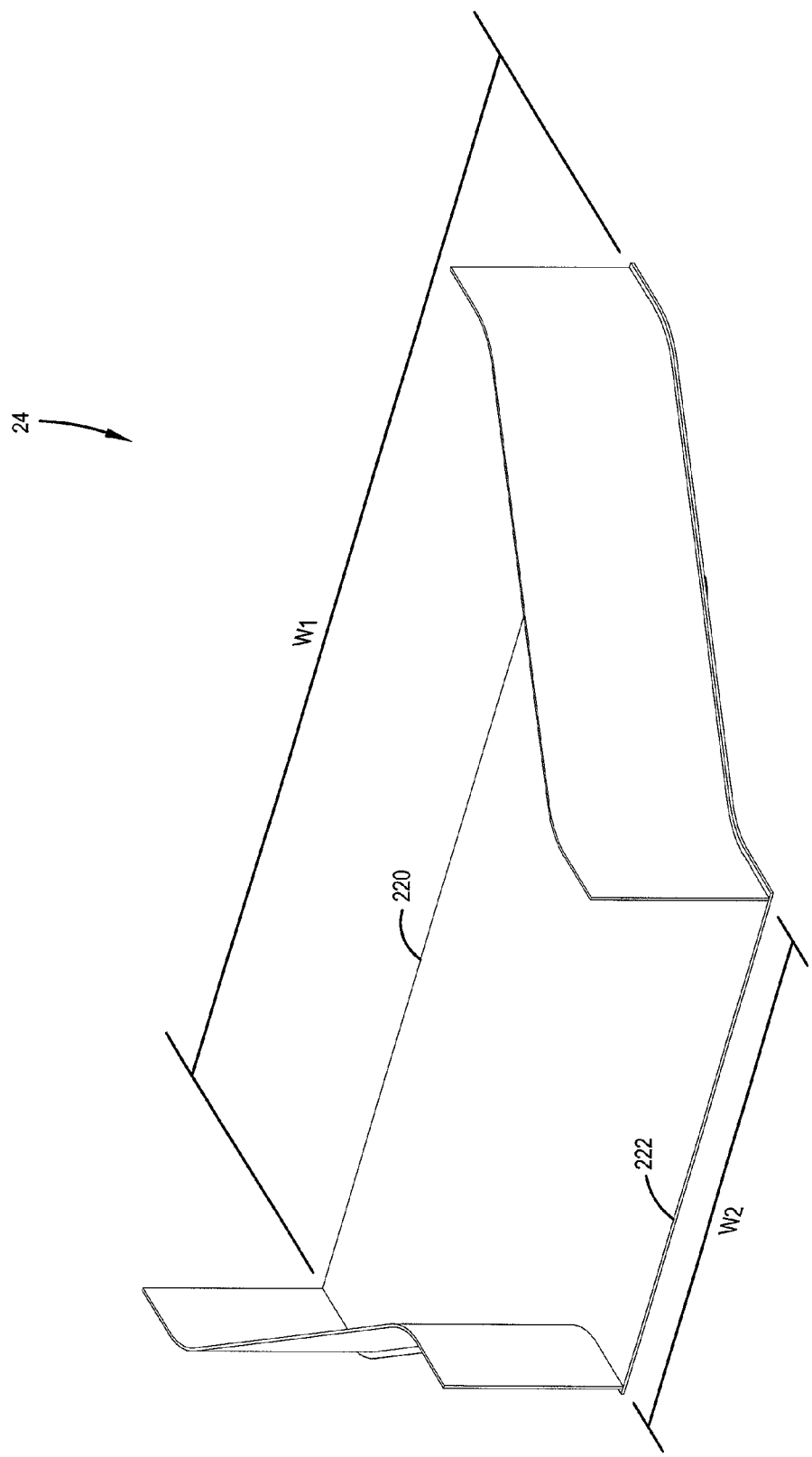
FIG. 28 is a top perspective view of the reducer component of the system of FIG. 1.

Referring now to FIG. 28, reducer component 24 is shown reducing the width of the lateral trough section pathway from one dimension W1 to a smaller dimension W2. End 220 is at the wider dimension W1, such as 24 inches, and opposite end 222 is at the narrower dimension W2, such as 12 inches. Reducer component 24 is mountable to couplers 16, or other couplers configured to lock to cross component 18.

Figure 29:
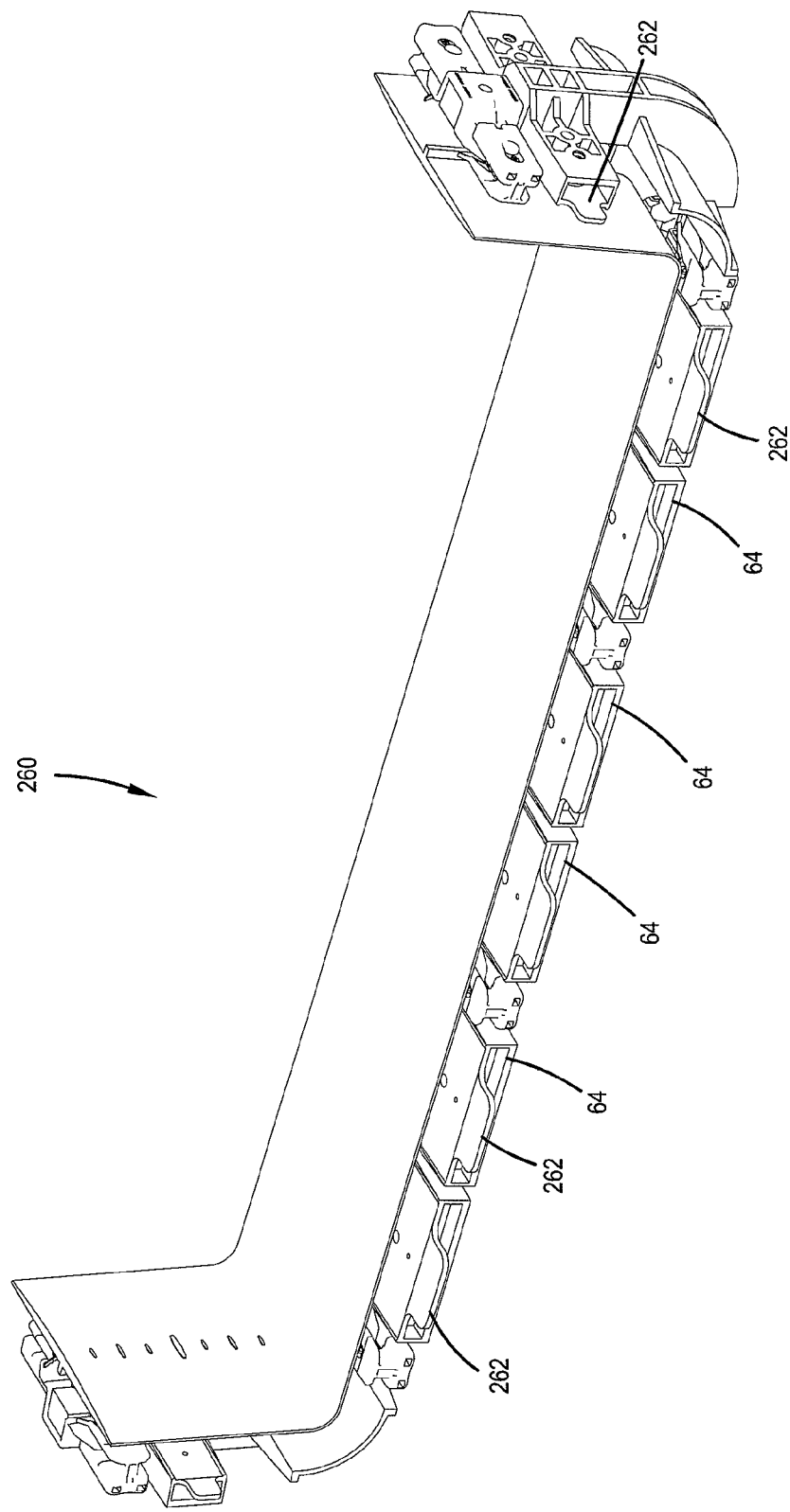
FIG. 29 is a top perspective view of an alternative embodiment of a coupler.
Figure 30:
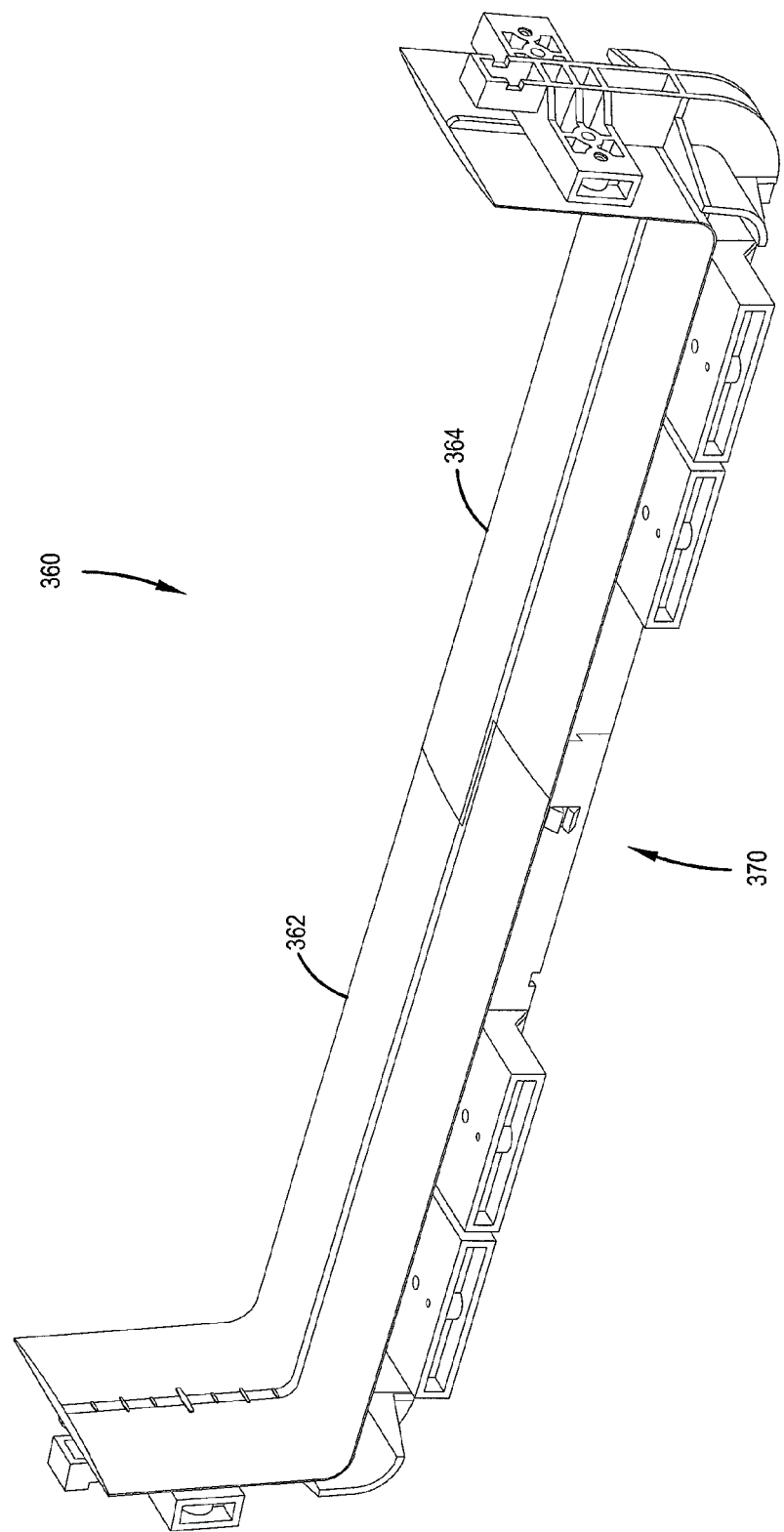
FIG. 30 is a top perspective view of a further alternative embodiment of a coupler.
Figure 31:
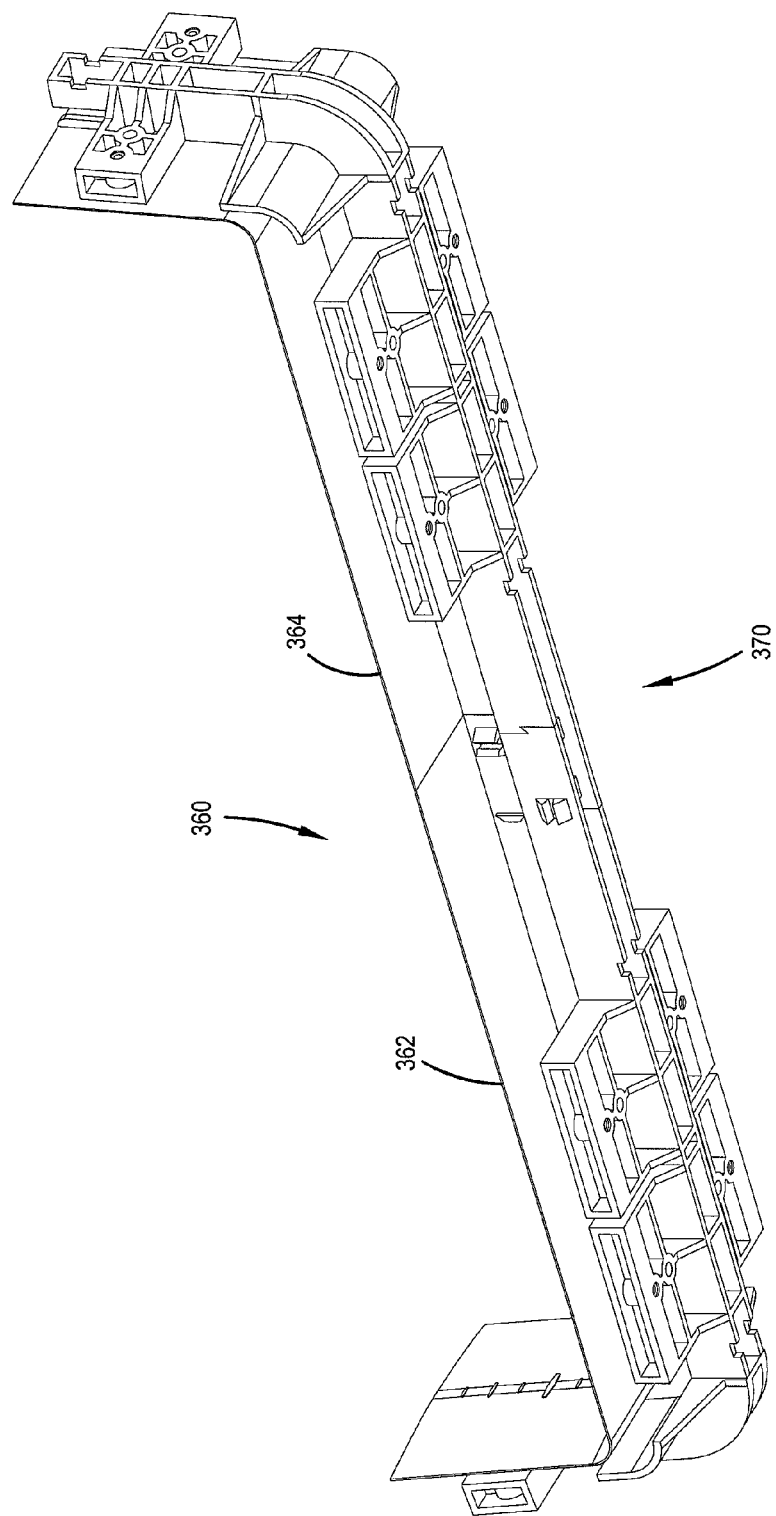
FIG. 31 is a bottom perspective view of the coupler of FIG. 30.
Figure 32:
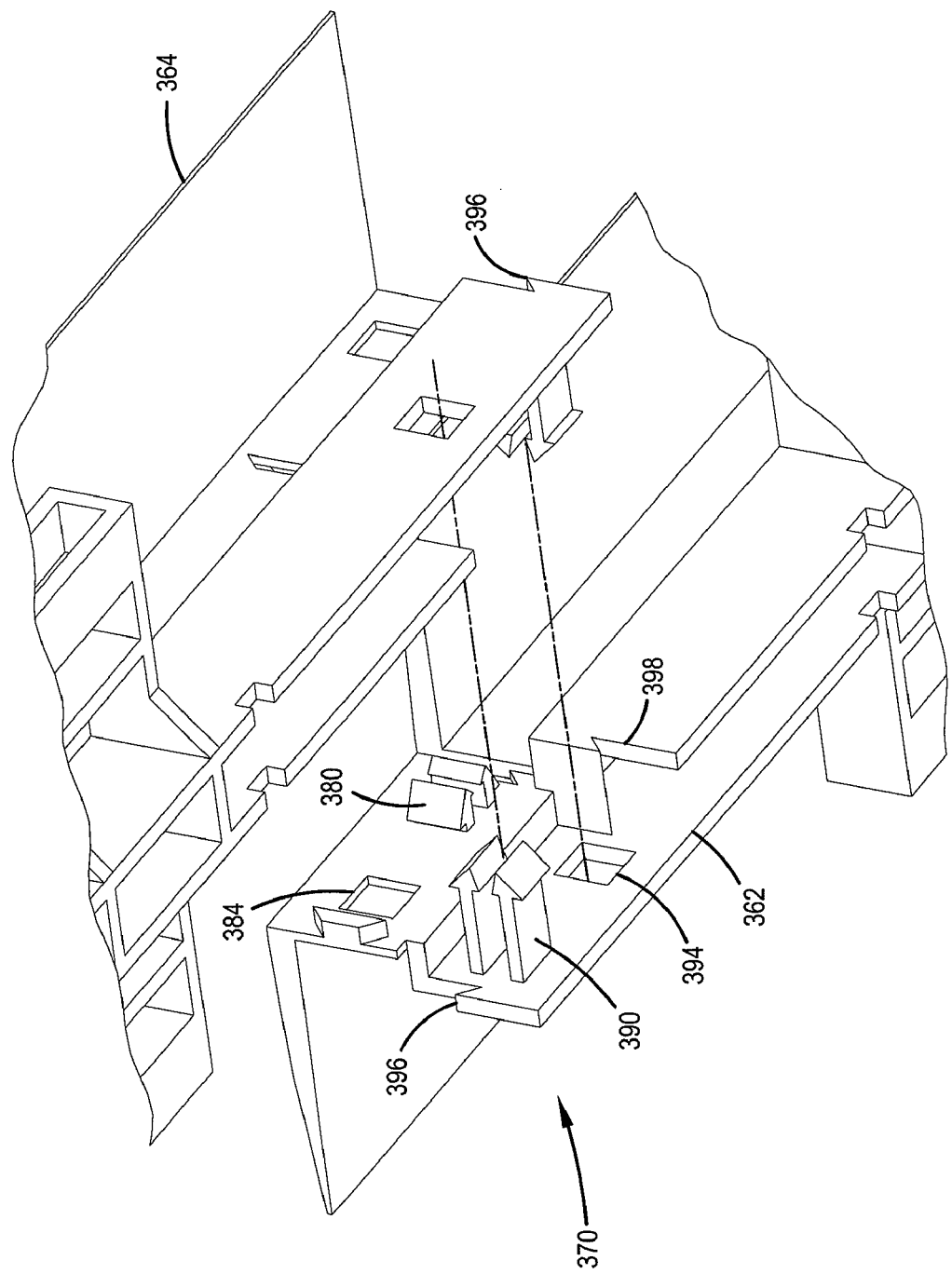
FIG. 32 is an exploded perspective view of portions of the coupler FIGS. 30 and 31.
Figure 33:
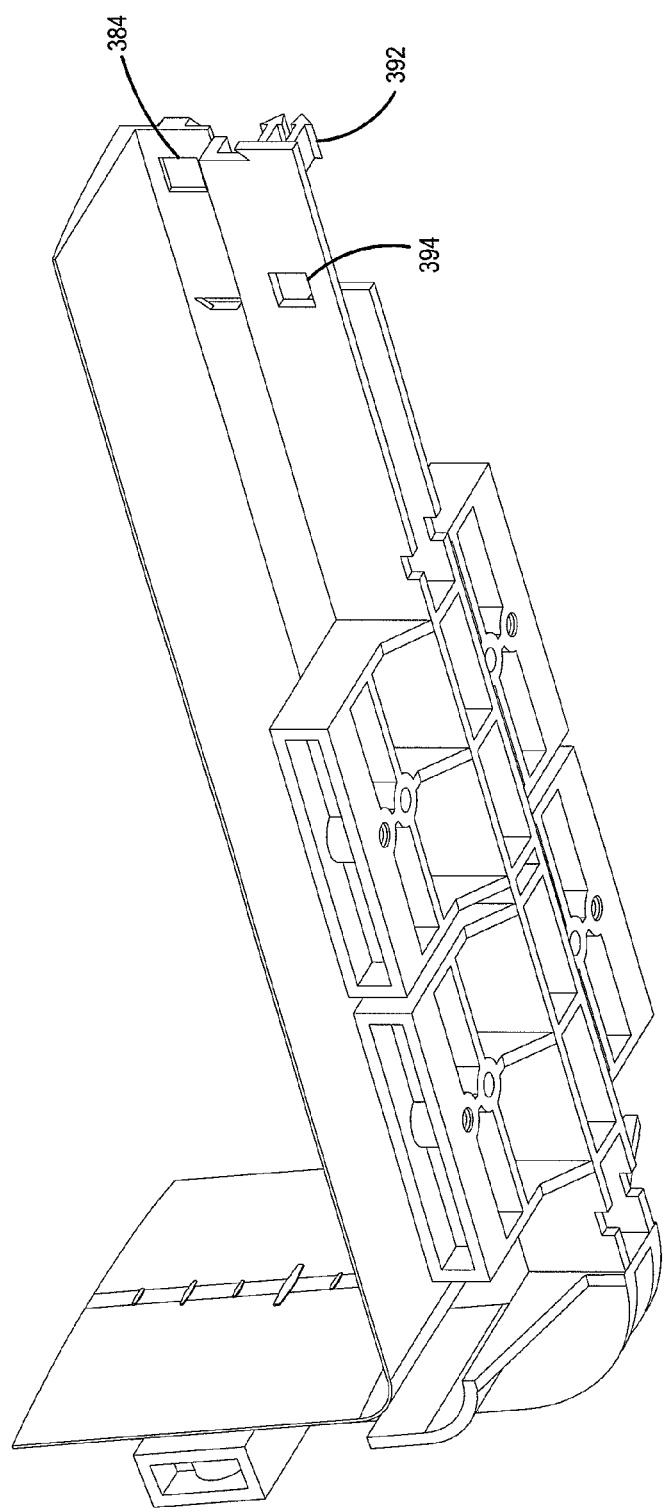
FIG. 33 is a first bottom perspective view of one of the sections of the coupler of FIGS. 30 and 31.
Figure 34:
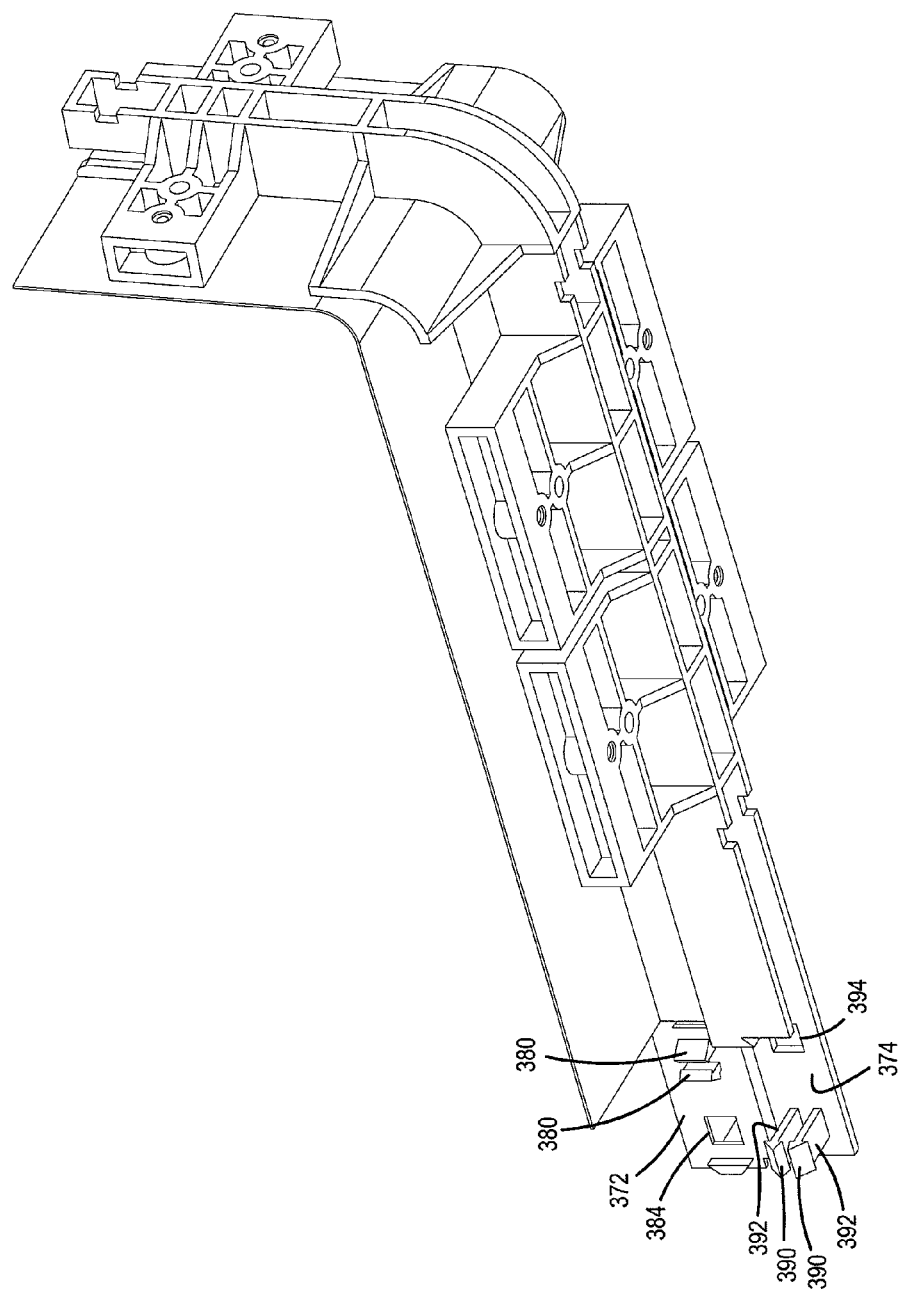
FIG. 34 is a further bottom perspective view of the section of FIG. 33.
Figure 38:
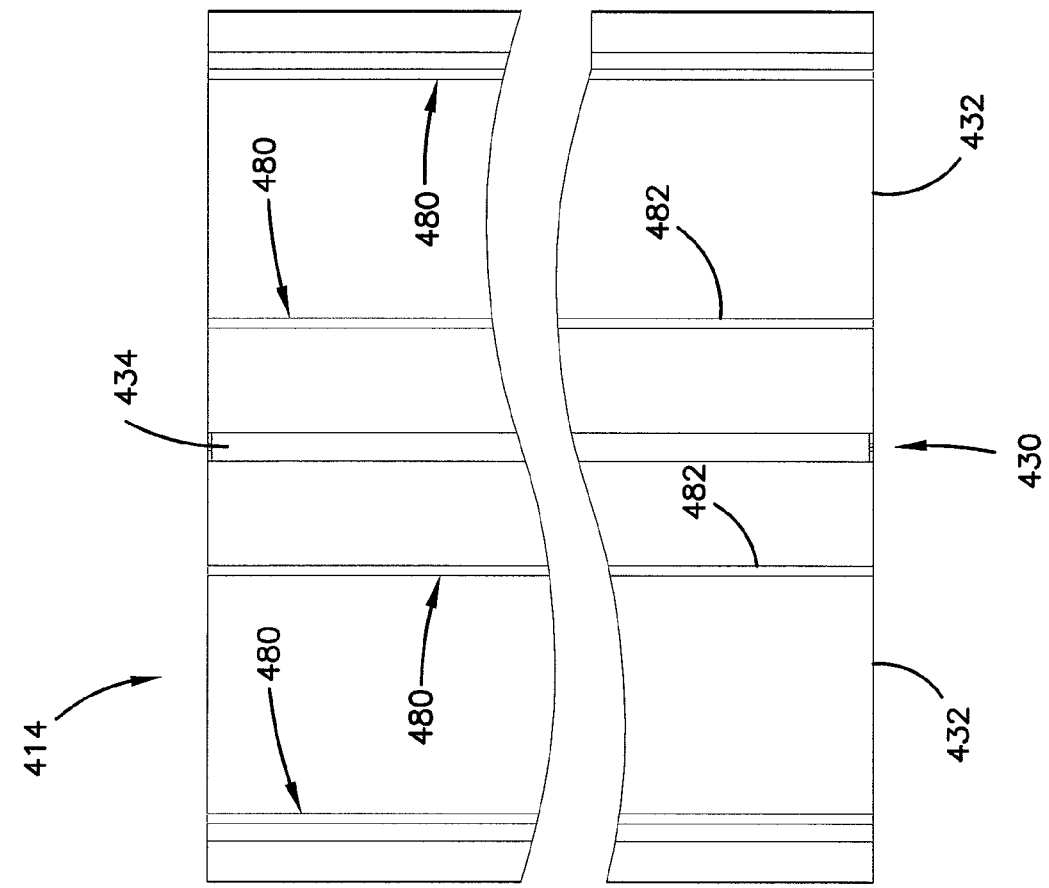
FIG. 38 is a bottom view of the longitudinal trough member of FIG. 35, with portions removed.

Referring now to FIG. 29, and alternative embodiment of a coupler 260 is shown with guide tabs 262 protruding from projections 64. Guide tabs 262 assist with locating projections 62 in the pockets of longitudinal trough members 14 during assembly of the system.

Referring now to FIGS. 30-34, an alternative embodiment of a coupler 360 is shown. Coupler 360 is provided in two sections 362, 364, which are preferably identical. A mating arrangement 370 mounts the two sections 362, 364 together. One preferred embodiment of mating arrangement 370 includes snaps. Each section 362, 364 includes first and second walls 372, 374 offset from one another. First wall 372 includes first tabs 380 with shoulders 382, and an aperture 384. Second wall 374 includes second tabs 390 with shoulders 392, and an aperture 394. The first tabs 380 of each wall 372 fit into the aperture 384 of the other wall 372 of the other section. The second tabs 390 of each wall 374 fit into the aperture 394 of the other wall 374 of the other section. Further cutouts 396, 398 are also matable together when mounting the sections together. By making the coupler in two sections, a less costly mold is needed for making coupling 360 from moldable materials.

Referring now to FIGS. 35-51, an alternative embodiment of a longitudinal trough member 414 is shown. Longitudinal trough member 414 is usable in system 10 and can be mated with the various couplers 16, 260, 360. Longitudinal trough member 414 includes multiple components held together by a mating arrangement 430. Longitudinal trough member 414 includes two sides 432 and a middle 434 which join together to form the U-shaped trough. In the illustrated embodiment, longitudinal trough member 414 is 6 feet long. Other lengths can be used, including longer or shorter.

Each of sides 432 of longitudinal trough member 414 are identical in the preferred embodiment. A base 460 defines a bottom wall of sides 432. The base includes an inside wall 462 and an outside wall 464. The plurality of ribs 466 define a space 468 between inside wall 462 and outside wall 464. A similar construction is provided for side walls 470, including an inside wall 472 an outside wall 474, and ribs 476.

Figure 50:
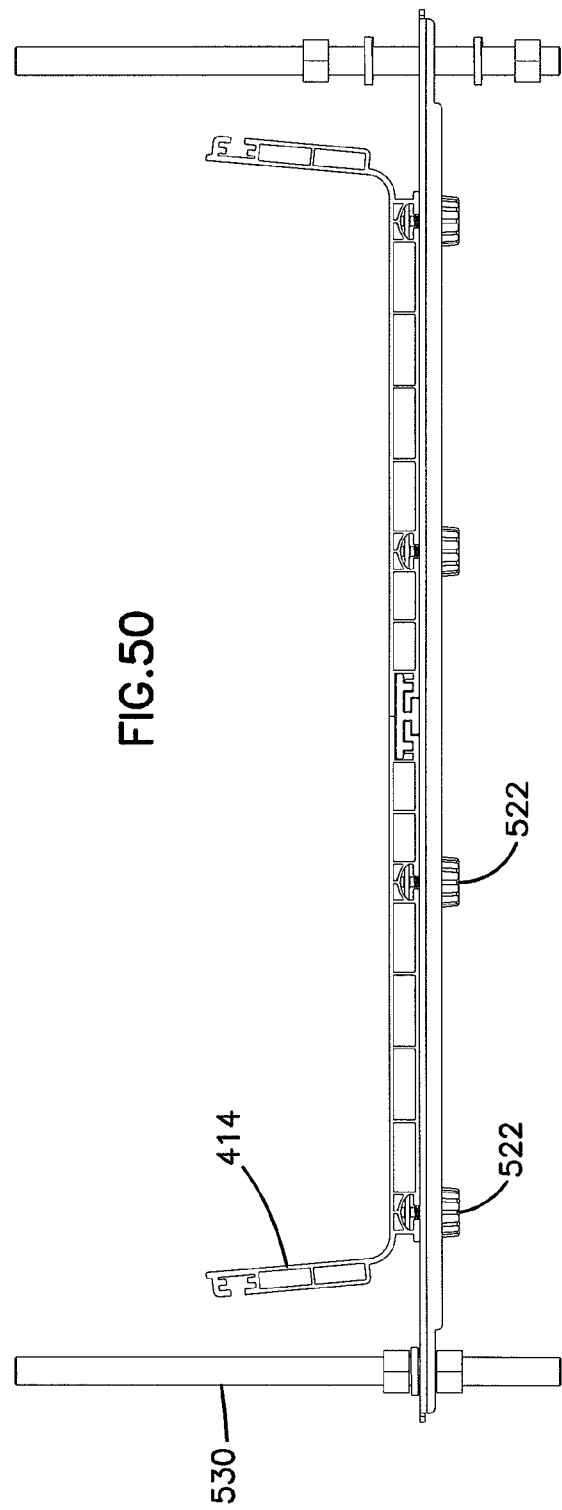
FIG. 50 is an end view of the longitudinal trough member of FIG. 35, shown with a mounting structure.
Figure 51:
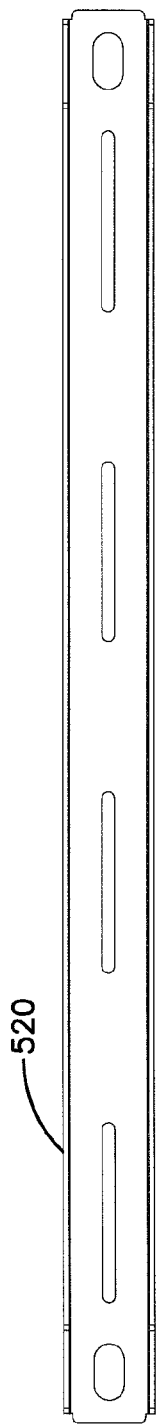
FIG. 51 is a bottom view of a mounting bracket of the mounting structure of FIG. 50.
Figure 53:
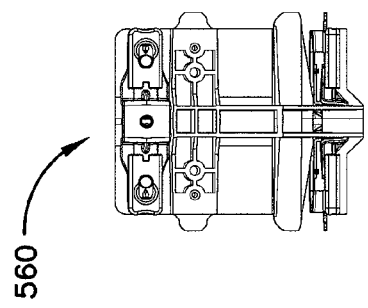
FIG. 53 is a side view of the coupler of FIG. 52.
Figure 52:
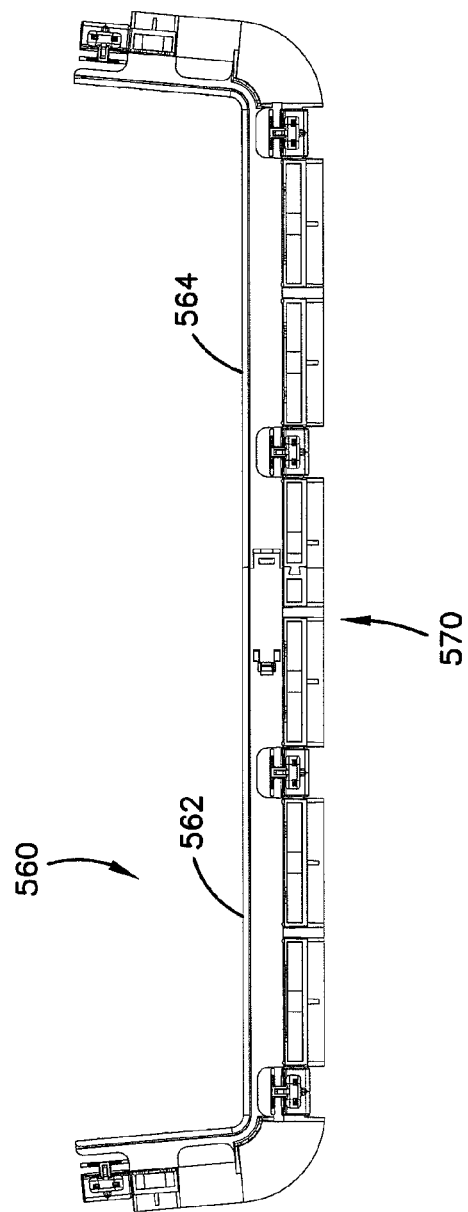
FIG. 52 is an end view of a further alternative embodiment of a coupler.

Each of sides 432 include various channels. Lower channels 480 permit connection of mounting hardware as shown in FIGS. 50 and 51. Lower channels 480 include a slotted opening 482 and a rounded top 484. FIG. 50 shows longitudinal trough member 414 connected to mounting bracket 520 of mounting structure 530 with mounting lugs 522. Lugs 522 fit into slotted openings 482 and the channels bounded by rounded tops 484.

Sides 432 further include side channels 488 also for use in mounting hardware or other system components. With respect to lower channels 480 and side channels 488 various structures associated with the couplers 16, 260, 360 and other system components will mate with the channels to interconnect the system components.

Sides 432 also include mating channels 490 for use in mating with middle 434. Each mating channel 490 includes an inner shoulder 492.

Figure 39:
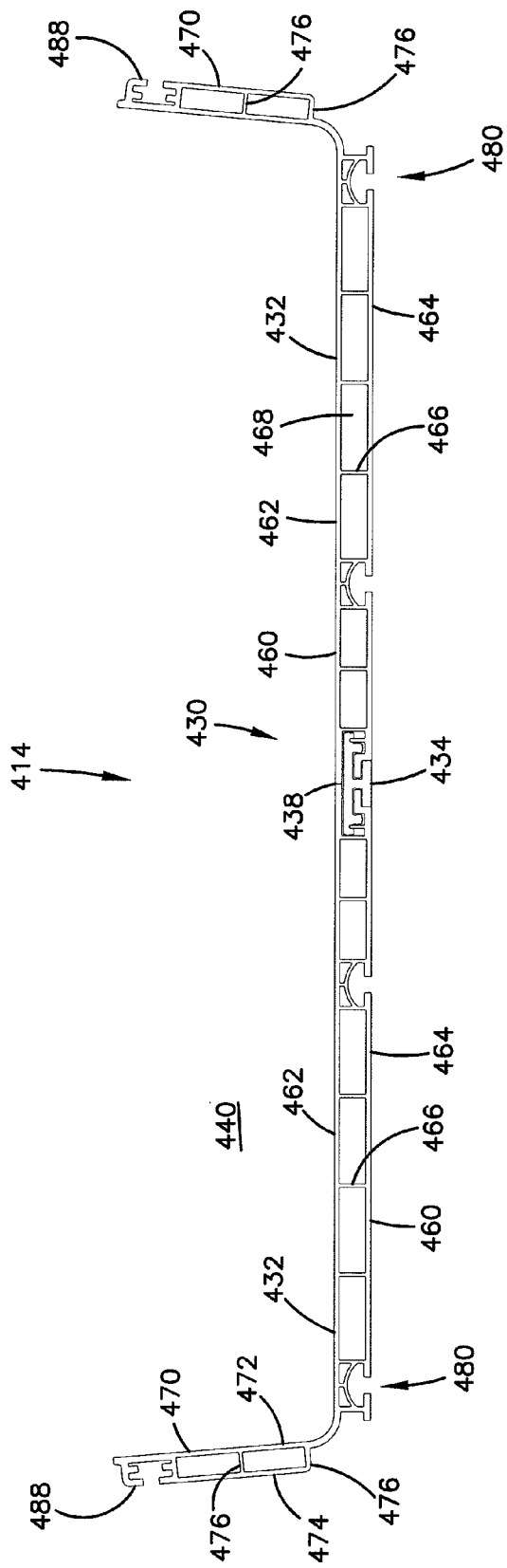
FIG. 39 is an end view of the longitudinal trough member of FIG. 35.
Figure 49:
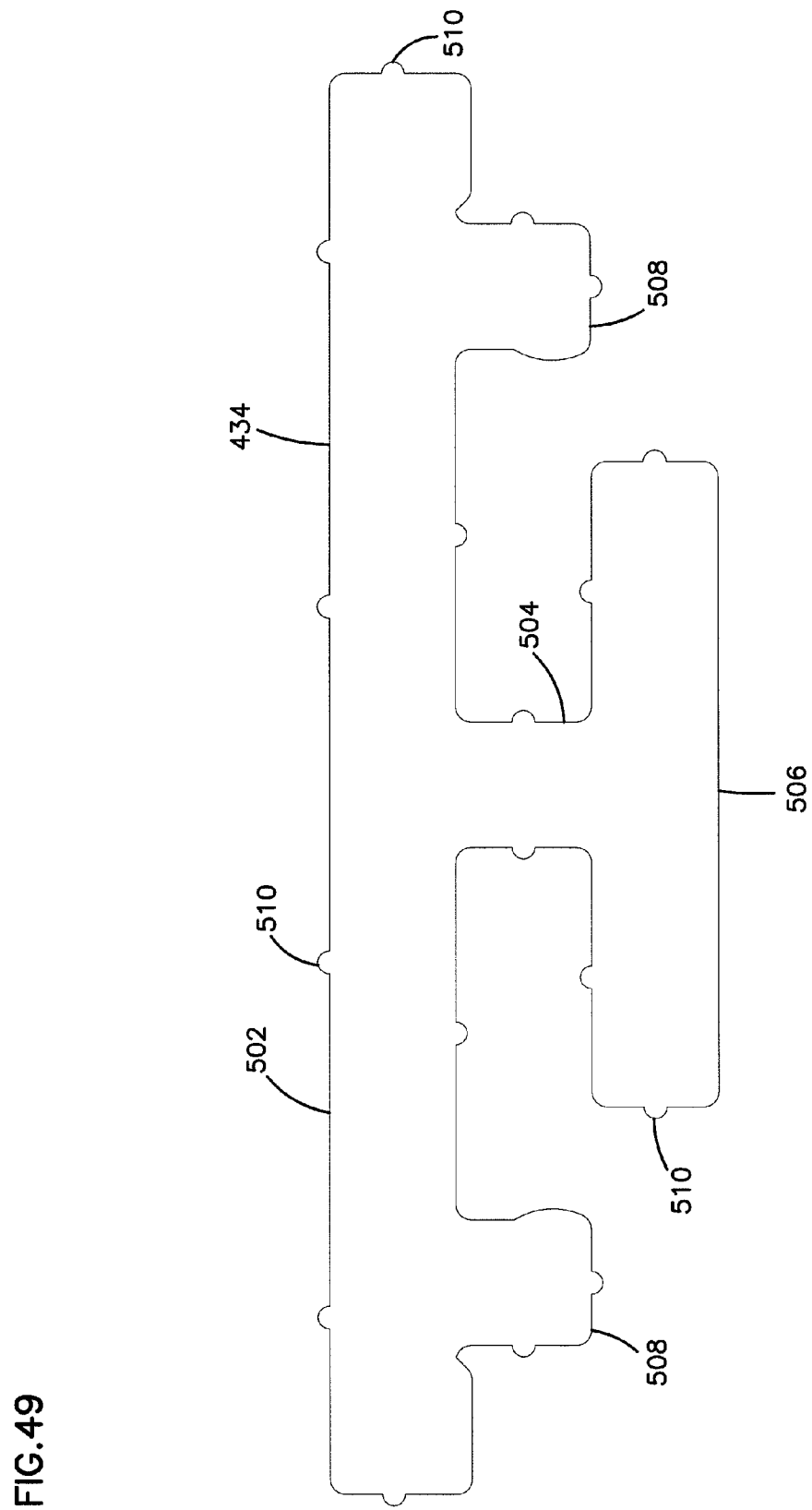
FIG. 49 is an end view of a middle section of the longitudinal trough member of FIG. 35.

When sides 432 and middle 434 are mated, only a single seam 438 is exposed within the cable troughing area 440 of longitudinal trough member 414. As shown in FIGS. 39-41, middle 434 is inserted within mating channel 490 to maintain sides 432 together. In the illustrated embodiment, middle 434 is constructed in two separate segments or pieces 436, which can be longitudinally inserted into mating channel 490 from opposite ends. As shown in FIG. 49, middle 434 includes a top 502, a middle portion 504 and a base 506 generally defining a T-shape. Middle 434 also includes two shoulders 508 which cooperate with shoulders 492 of mating channel 490 to retain sides 43 together. In the preferred embodiment, middle 434 includes a plurality of small ribs 510 which also run longitudinally along middle 434 to assist with forming a secure and tight fit within mating channels 490.

Referring now to FIGS. 52-60, an alternative embodiment of a coupler 560 is shown. Coupler 560 includes identical sections 562, 564. Sections 562, 564 include a mating arrangement 570 for connecting sections 562, 564 together. One preferred mating arrangement 570 includes snaps. Each section 562, 564 includes an offset portion 572. A snap 574 on each section 562, 564 fits into a recess 576 on the other section 564, 562. Various further mating arrangements including dovetails are used in mating arrangement 570. A first dovetail slide arrangement includes a first projection 582 and a mating groove 584. The second dovetail slide arrangement includes a pin 588 and a mating slot 590.

Figure 61:
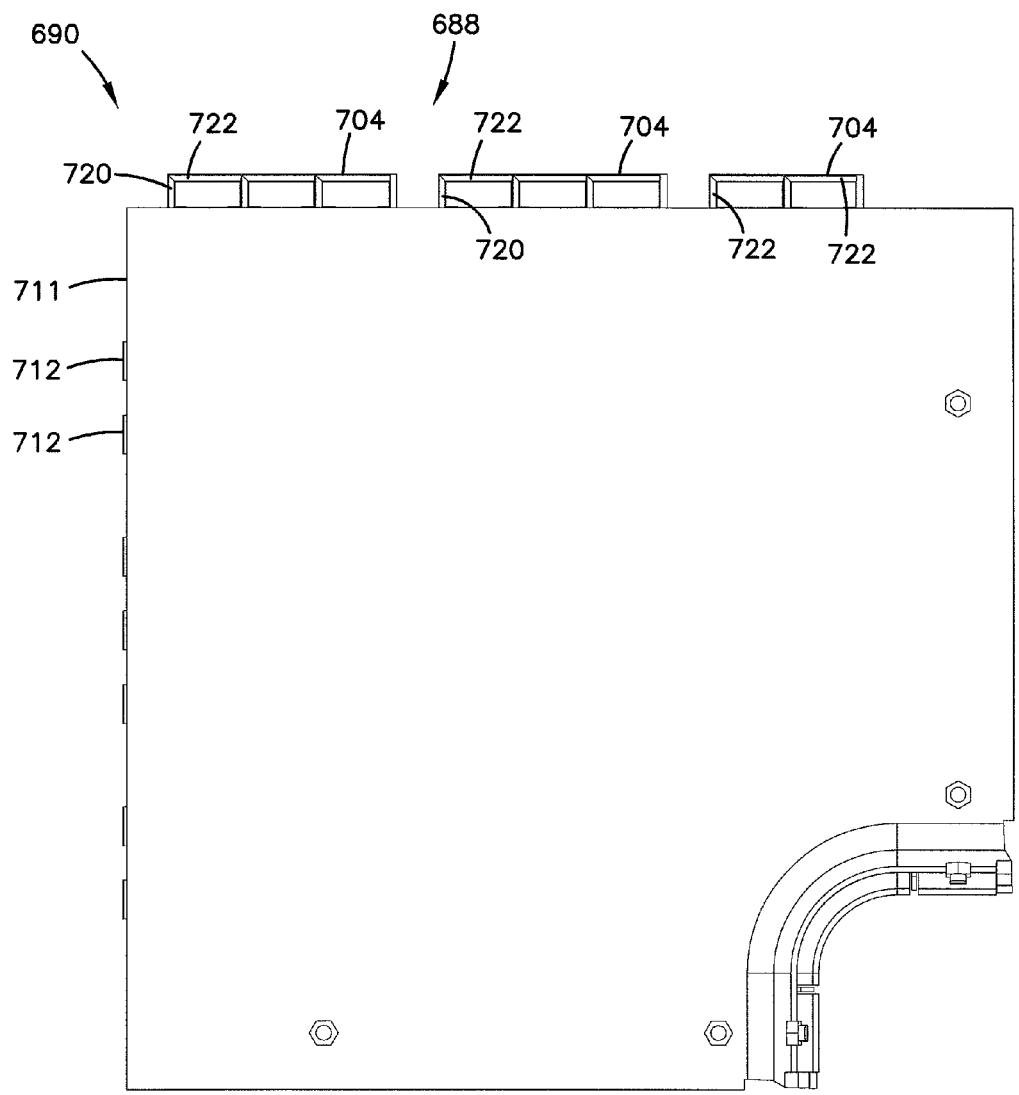
FIG. 61 is a top view of an alternative embodiment of one of the sections of the cross component of FIG. 7.
Figure 62:
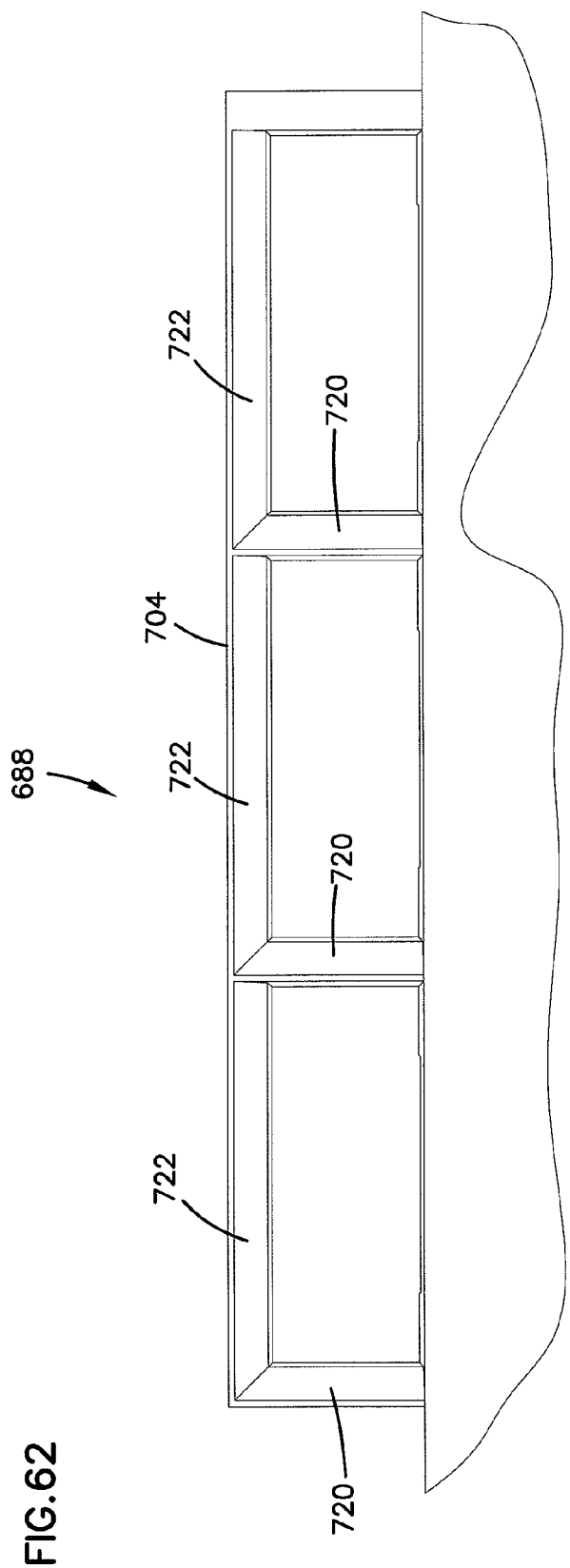
FIG. 62 is an enlarged view of a portion of the section of FIG. 61.

Referring now to FIGS. 61-63, an alternative embodiment of a section 688 of a modified cross component is shown. In similar manner as above for cross component 18, each cross component can also be made using four separate but matable sections 688. A mating arrangement 690 connects sections 688 together. In general, mating arrangement 690 works in a similar manner as mating arrangement 90, described above. One difference, useful to assist in reducing the forces necessary to assemble a cross component, includes one of tabs 710 including a smooth surface 711, instead of a tab 712, similar to tab 112 noted above. A further difference over mating arrangement 90 described above is the use of ramp surfaces 720, 722 on enclosure 704. Such ramps assist with alignment of tabs 710 during assembly.

The above specification, examples and data provide a complete description of the manufacture and use of the invention. Since many embodiments of the invention can be made without departing from the spirit and scope of the invention, the invention resides in the claims hereinafter appended.

What is claimed is:

1. A telecommunications cable management system comprising:
    a base including a planar top surface, and an opposite facing bottom surface, the base including first and second ends, and first and second sides, the ends and the sides forming a perimeter of the base element;
    two upstanding sides extending from the base;
    wherein the base includes first and second laterally extending sections;
    a mating arrangement between the first and second laterally extending sections, wherein the mating arrangement extends parallel to the upstanding sides;
    wherein the upstanding sides are longitudinal sides extending parallel to one another to define a longitudinal trough member, and wherein the first and second laterally extending sections extend parallel to the upstanding sides;
    wherein the mating arrangement includes a third laterally extending section extending parallel to the upstanding sides, the third laterally extending section extending between the first and second laterally extending sections, wherein the first and second laterally extending sections abut one another.

2. The system of claim 1, wherein the third laterally extending section defines a T-shape in cross-section.

3. The system of claim 1, wherein the base includes an inside wall and a spaced outside wall.

4. The system of claim 1, wherein the third laterally extending section is formed of plural segments, shorter than the first and second laterally extending sections.

* * * * *